(12) United States Patent
Ikeuchi et al.

(10) Patent No.: US 11,613,701 B2
(45) Date of Patent: Mar. 28, 2023

(54) COMPOUND, LIQUID-CRYSTAL COMPOSITION, AND RADIO FREQUENCY PHASE SHIFTER

(71) Applicant: DIC Corporation, Tokyo (JP)

(72) Inventors: Takaya Ikeuchi, Saitama (JP); Masanao Hayashi, Saitama (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 17/363,011

(22) Filed: Jun. 30, 2021

(65) Prior Publication Data

US 2022/0025264 A1    Jan. 27, 2022

(30) Foreign Application Priority Data

Jul. 14, 2020  (JP) .............................. JP2020-120472

(51) Int. Cl.
*C09K 19/18* (2006.01)
*C09K 19/32* (2006.01)

(52) U.S. Cl.
CPC .............. *C09K 19/18* (2013.01); *C09K 19/32* (2013.01); *C09K 2019/188* (2013.01)

(58) Field of Classification Search
CPC ................................ C09K 19/32; C09K 19/42
See application file for complete search history.

(56) References Cited

FOREIGN PATENT DOCUMENTS

| JP | 2001034197 | | 2/2001 |
|---|---|---|---|
| JP | 2001040355 | A * | 2/2001 |
| JP | 2013103897 | | 5/2013 |
| JP | 2014514325 | | 6/2014 |
| WO | WO-2022030343 | A1 * | 2/2022 |

OTHER PUBLICATIONS

JP-2001040355-A (EPO Machine Translation) (Year: 2022).*
JP-2001040355-A (EPO Abstract Machine Translation) (Year: 2022).*

* cited by examiner

*Primary Examiner* — Chanceity N Robinson
(74) *Attorney, Agent, or Firm* — JCIPRNET

(57) ABSTRACT

A compound is represented by general formula (I), a liquid-crystal composition contains this compound, and devices are made using this liquid-crystal composition. Having a large refractive-index anisotropy Δn and a sufficiently high Tni, highly compatible with liquid-crystal compositions, and exhibiting a high dielectric anisotropy in the radio frequency range, the compound is a useful material for RF phase shifters, phased-array antennae, image recognition devices, distance meters, liquid-crystal displays, liquid-crystal lenses, and birefringent lenses for 3D image display, among other devices.

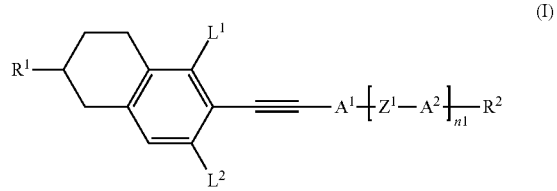

(I)

10 Claims, No Drawings

COMPOUND, LIQUID-CRYSTAL COMPOSITION, AND RADIO FREQUENCY PHASE SHIFTER

CROSS-REFERENCE TO RELATED APPLICATION

This application claims the priority benefits of Japanese application no. 2020-120472, filed on Jul. 14, 2020. The entirety of the above-mentioned patent application is hereby incorporated by reference herein and made a part of this specification.

BACKGROUND

Technical Field

The disclosure relates to a compound, a liquid-crystal composition containing this compound, and devices made using this liquid-crystal composition.

Description of the Related Art

Liquid-crystal compositions are used in mobile data terminals, such as smartphones and tablet computers, and in display applications, such as TVs and computer, advertising, and signage displays. A new application of liquid-crystal compositions that is gathering attention is antennae that exchange radio waves between a moving object, such as an automobile, and a communication satellite.

The known antennae for satellite communication are parabolic. When used on a moving object, the parabolic antenna needs to be directed toward the satellite as the object moves, and this means the moving object needs to have a large movable element. An antenna made with a liquid-crystal composition, by contrast, does not need to be moved and can be flat in shape because it changes the directions in which it transmits and receives radio waves through the operation of liquid crystals.

In such applications, the refractive-index anisotropy Δn of the liquid-crystal composition needs to be, for example, at least approximately 0.4, much greater than the Δn requirement in display applications. The compound added to and used in the liquid-crystal composition therefore needs to have a large Δn. In addition to this, the compound also needs to exhibit a high nematic-isotropic phase transition temperature (Tni) so that the composition can be used outdoors. Tolane-structured compounds reportedly have a large Δn, but these compounds do not have a sufficiently large Δn when added to a liquid-crystal composition for antenna applications, and their Tni is not sufficiently high either (Japanese Unexamined Patent Application Publication (Translation of PCT Application) No. 2014-514325). Tetralin (1,2,3,4-tetrahydronaphthalene)-structured compounds are reported to exhibit a liquid-crystal phase (Japanese Unexamined Patent Application Publication No. 2001-34197), but these compounds do not always have a sufficiently large Δn either, and their phase modulatability is insufficient because of a low dielectric anisotropy in the radio frequency (RF) range. A report argues that azotolane-structured compounds overcome these disadvantages (Japanese Unexamined Patent Application Publication No. 2013-103897), but, unfortunately, they are not highly reliable. Overall, there is a need to develop a compound that has a large Δn and a sufficiently high Tni, is highly compatible with liquid-crystal compositions, and exhibits a high dielectric anisotropy in the RF range.

The disclosure provides a compound that has a large refractive-index anisotropy (Δn) and a sufficiently high Tni, is highly compatible with liquid-crystal compositions, and exhibits a high dielectric anisotropy (Δε) in the radio frequency range, a liquid-crystal composition containing this compound, and devices made using this liquid-crystal composition.

SUMMARY

After extensive research, the inventors finally developed a particular compound. That is, the disclosure provides a compound represented by general formula (I):

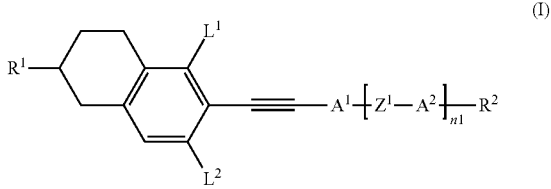

where $R^1$ denotes a hydrogen atom or a C1 to C20 linear or C3 to C20 branched or cyclic alkyl group, the alkyl group optionally having any hydrogen atom therein replaced with a halogen atom and optionally having one —$CH_2$— therein, or each of two or more independently, replaced with —O—, —S—, —CO—, —CS—, —COO—, —OCO—, —CO—S—, —S—CO—, —O—CO—O—, —CO—NH—, —NH—CO—, —CH=CH—, —CF=CF—, or —C≡C—, with the proviso that no oxygen atoms are bound directly to one another; $R^2$ denotes a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, or a C1 to C20 linear or C3 to C20 branched or cyclic alkyl group optionally having one —$CH_2$— therein, or each of two or more independently, replaced with —O—, —S—, —CO—, —CS—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, with the proviso that no oxygen atoms are bound directly to one another, the alkyl group optionally having any hydrogen atom therein replaced with a fluorine atom; $A^1$ and $A^2$ each independently denote a substituted or unsubstituted C3 to C16 hydrocarbon ring or heterocycle, and multiple $A^2$s may be the same or different; $L^1$ and $L^2$ each independently denote a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a C1 to C20 linear or C3 to C20 branched or cyclic alkyl group optionally having one —$CH_2$— therein, or each of two or more independently, replaced with —O—, —S—, —CO—, —CS—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—

CH=CH—, —CH=CH—, —CF=CF—, or —C≡C—, with the proviso that no oxygen atoms are bound directly to one another, the alkyl group optionally having any hydrogen atom therein replaced with a fluorine atom; $Z^1$ on each occurrence independently denotes a single bond, —CH=CH—, —CF=CF—, —C≡C—, —COO—, —OCO—, —OCOO—, —CH$_2$O—, —OCH$_2$—, —CF$_2$O—, —OCF$_2$—, —CH=CHCOO—, —OCOCH=CH—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, —CH=N—N=CH—, —CH=N—, —N=CH—, or a C2 to C20 alkylene group, the alkylene group optionally having one or two or more —CH$_2$-s therein replaced with —O—, —COO—, or —OCO—, with the proviso that no oxygen atoms are bound directly to one another, multiple $Z^1$s may be the same or different, and at least one of the $Z^1$s, or the $Z_1$ if there is only one $Z_1$, denotes a group other than a single bond; and n1 denotes an integer of 1 to 3. A liquid-crystal composition containing this compound and devices made using this liquid-crystal composition are also provided.

DESCRIPTION OF THE EMBODIMENTS

The disclosure provides a compound represented by general formula (I), a liquid-crystal composition containing this compound, and devices made using this liquid-crystal composition.

In general formula (I), $R^1$ denotes a hydrogen atom or a C1 to C20 linear or C3 to C20 branched or cyclic alkyl group. In the alkyl group, any hydrogen atom in the alkyl group may be replaced with a halogen atom, and one —CH$_2$—, or each of two or more independently, may be replaced with —O—, —S—, —CO—, —CS—, —COO—, —OCO—, —CO—S—, —S—CO—, —O—CO—O—, —CO—NH—, —NH—CO—, —CH=CH—, —CF=CF—, or —C≡C—. No oxygen atoms are bound directly to one another. For the compound's compatibility with liquid-crystal compositions, refractive-index anisotropy and voltage holding ratio, ease of synthesis, and availability of raw materials, it is preferred that $R^1$ denote a hydrogen atom or a C1 to C20 linear or branched alkyl group optionally having any hydrogen atom therein replaced with a halogen atom and optionally having one —CH$_2$— therein, or each of two or more independently, replaced with —O—, —S—, —CH=CH—, —CF=CF—, or —C≡C—. More preferably, $R^1$ denotes a C1 to C12 linear or branched alkyl group optionally having any hydrogen atom therein replaced with a fluorine atom and optionally having one —CH$_2$— therein, or each of two or more independently, replaced with —O—, —CH=CH—, or —C≡C—, even more preferably a C1 to C8 alkyl, C1 to C7 alkoxy, C2 to C8 alkenyl, C2 to C7 alkenyloxy, or C2 to C8 alkynyl group. It is particularly preferred that $R^1$ denote a C2 to C5 alkyl, C1 to C4 alkoxy, C2 to C5 alkenyl, or C3 to C7 alkynyl group.

In general formula (I), $R^2$ denotes a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, or a C1 to C20 linear or C3 to C20 branched or cyclic alkyl group optionally having one —CH$_2$— therein, or each of two or more independently, replaced with —O—, —S—, —CO—, —CS—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—. In the alkyl group, no oxygen atoms are bound directly to one another, and any hydrogen atom may be replaced with a fluorine atom. For the compound's compatibility with liquid-crystal compositions, refractive-index anisotropy, dielectric anisotropy, and voltage holding ratio, ease of synthesis, and availability of raw materials, it is preferred that $R^2$ denote a fluorine atom, a chlorine atom, a nitro group, a cyano group, an isocyano group, or a C1 to C20 linear or C3 to C20 branched or cyclic alkyl group optionally having any hydrogen atom therein replaced with a fluorine atom and optionally having one —CH$_2$— therein, or each of two or more independently, replaced with —O—, —S—, —CH=CH—, —CF=CF—, or —C≡C—. More preferably, $R^2$ denotes a fluorine atom, a cyano group, or a C1 to C10 linear or C3 to C10 branched or cyclic alkyl group optionally having any hydrogen atom therein replaced with a fluorine atom and optionally having —CH$_2$-(s) therein replaced with —O—, even more preferably a fluorine atom, a cyano group, or a C1 to C10 linear or C3 to C10 branched or cyclic alkyl group. It is particularly preferred that $R^2$ denotes a fluorine atom, a cyano group, or a C1 to C8 linear alkyl group.

In general formula (I), $A^1$ and $A^2$ each independently denote a substituted or unsubstituted C3 to C16 hydrocarbon ring or heterocycle. Multiple $A^2$s may be the same or different. For the compound's compatibility with liquid-crystal compositions, refractive-index anisotropy, dielectric anisotropy, and voltage holding ratio, ease of synthesis, and availability of raw materials, it is preferred that $A^1$ and $A^2$ each independently denote a group selected from the group consisting of:

(a) a 1,4-cyclohexylene group (optionally having one —CH$_2$— or two or more nonadjacent —CH$_2$-s therein replaced with —O— or —S—);

(b) a 1,4-phenylene group (optionally having one —CH= or two or more nonadjacent —CH=s therein replaced with —N=);

(c) a 1,4-cyclohexenylene, bicyclo[2.2.2]octane-1,4-diyl, naphthalene-2,6-diyl, naphthalene-1,4-diyl, 1,2,3,4-tetrahydronaphthalene-2,6-diyl, 5,6,7,8-tetrahydronaphthalene-1,4-diyl, decahydronaphthalene-2,6-diyl, anthracene-2,6-diyl, anthracene-1,4-diyl, anthracene-9,10-diyl, or phenanthrene-2,7-diyl group (optionally having hydrogen atom(s) therein replaced with a fluorine or chlorine atom, and the naphthalene-2,6-diyl, naphthalene-1,4-diyl, 1,2,3,4-tetrahydronaphthalene-2,6-diyl, 5,6,7,8-tetrahydronaphthalene-1,4-diyl, anthracene-2,6-diyl, anthracene-1,4-diyl, anthracene-9,10-diyl, or phenanthrene-2,7-diyl group optionally having one —CH— or two or more —CH=s replaced with —N=); and (d) a thiophene-2,5-diyl, benzothiophene-2,5-diyl, benzothiophene-2,6-diyl, dibenzothiophene-3,7-diyl, dibenzothiophene-2,6-diyl, or thieno[3,2-b]thiophene-2,5-diyl group (optionally having one —CH= or two or more nonadjacent —CH=s therein replaced with —N=), unsubstituted or substituted with one or more substituents $L^3$, with multiple $A^2$s being the same or different. More preferably, $A^1$ and $A^2$ each independently denote a group selected from 1,4-phenylene, naphthalene-2,6-diyl, naphthalene-1,4-diyl, 5,6,7,8-tetrahydronaphthalene-1,4-diyl, phenanthrene-2,7-diyl, benzothiophene-2,5-diyl, benzothiophene-2,6-diyl, benzothiazole-2,5-diyl, benzothiazole-2,6-diyl, dibenzothiophene-3,7-diyl, dibenzothiophene-2,6-diyl, and thieno[3,2-b]thiophene-2,5-diyl groups, unsubstituted or substituted with one or more substituents $L^3$, with multiple $A^2$s being the same or different. It is even more preferred that $A^1$ and $A^2$ each independently denote a group selected from formulae (A-1) to (A-17), with multiple $A^2$s being the same or different:

(A-1)
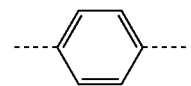

(A-2)

(A-3)
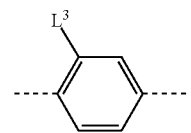

(A-4)
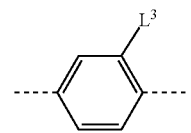

(A-5)
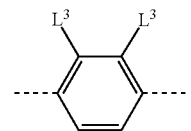

(A-6)
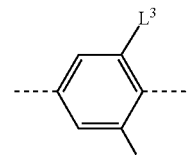

(A-7)
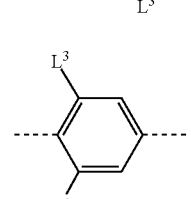

(A-8)
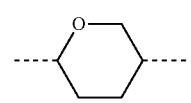

(A-9)
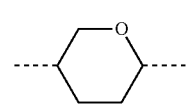

(A-10)
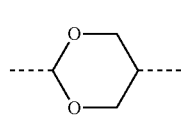

(A-11)
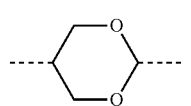

(A-12)
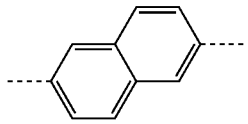

(A-13)
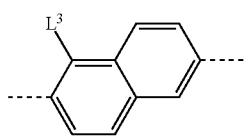

(A-14)
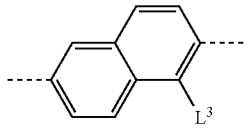

(A-15)
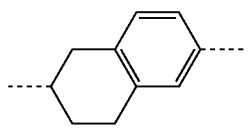

(A-16)
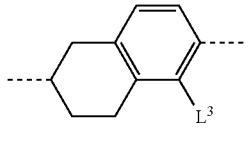

(A-17)
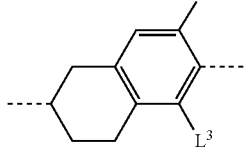

(where the broken lines represent binding sites, and multiple $L^3$s may be the same or different), still more preferably a group selected from formulae (A-1) to (A-7), (A-12), (A-15), and (A-17). It is particularly preferred that $A^1$ and $A^2$ each independently denote a group selected from formulae (A-1) and (A-3) to (A-7).

$L^3$ denotes a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a C1 to C20 linear or C3 to C20 branched or cyclic alkyl group optionally having one —CH$_2$— therein, or each of two or more independently, replaced with —O—, —S—, —CO—, —CS—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—. In the alkyl group, no oxygen atoms are bound directly to one another, and any hydrogen atom may be replaced with a fluorine atom. For the compound's compatibility with liquid-crystal compositions, refractive-index anisotropy, dielectric anisotropy, and voltage holding ratio, ease of synthesis, and availability of raw materials, it is preferred that $L^3$ denote a fluorine atom, a chlorine atom, or a C1 to C20 linear or C3 to C20 branched or cyclic alkyl group optionally having any hydrogen atom therein replaced with a fluorine atom and optionally having one —CH$_2$— therein, or each of two or more independently, replaced with —O—, —S—, —CH=CH—, —CF=CF—, or —C≡C—. More preferably, L$^3$ denotes a fluorine atom or a C1 to C10 linear or C3 to C10 branched or cyclic alkyl group optionally having any hydrogen atom therein replaced with a fluorine atom and optionally having —CH$_2$-(s) therein replaced with —O—, even more preferably a fluorine atom or a C1 to C10 linear or C3 to C10 branched or cyclic alkyl group. It is particularly preferred that L$^3$ denote a fluorine atom or a C1 to C8 linear alkyl group.

In general formula (I), Z$^1$ on each occurrence independently denotes a single bond, —CH=CH—, —CF=CF—, —C≡C—, —COO—, —OCO—, —OCOO—, —CH$_2$O—, —OCH$_2$—, —CF$_2$O—, —OCF$_2$—, —CH=CHCOO—, —OCOCH=CH—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, —CH=N—N=CH—, —CH=N—, —N=CH—, or a C2 to C20 alkylene group. The alkylene group may have one or two or more —CH$_2$-s therein replaced with —O—, —OCO—, or —OCO—, but preferably in a structure in which no oxygen atoms are bound directly to one another. Multiple Z$^1$s may be the same or different. Preferably, at least one of the Z$^1$s, or the Z$_1$ if there is only one Z$_1$, denotes a group other than a single bond as this increases Δn. For the compound's compatibility with liquid-crystal compositions, refractive-index anisotropy, dielectric anisotropy, and voltage holding ratio, ease of synthesis, and availability of raw materials, it is preferred that Z$^1$ on each occurrence independently denote a single bond, —CH=CH—, —CF=CF—, —C≡C—, —OCO—, —OCO—, —OCOO—, —CH$_2$O—, —OCH$_2$—, —CF$_2$O—, —OCF$_2$—, —CH=CHCOO—, —OCOCH=CH—, —CH=C(CH$_3$)COO—, —OCOC(CH$_3$)=CH—, —CH=N—N=CH—, —CH=N—, or —N=CH—. More preferably, Z$^1$ on each occurrence independently denotes a single bond, —CH=CH—, —CF=CF—, —C≡C—, —COO—, —OCO—, —OCOO—, —CH=CHCOO—, —OCOCH=CH—, —CH=C(CH$_3$)COO—, —OCOC(CH$_3$)=CH—, —CH=N—N=CH—, —CH=N—, or —N=CH—, even more preferably a single bond, —CH=CH—, —CF=CF—, —C≡C—, —COO—, —OCO—, —CH=N—N=CH—, —CH=N—, or —N=CH—. It is particularly preferred that Z$^1$ on each occurrence independently denote a single bond, —CH=CH—, —CF=CF—, —C≡C—, —CH=N—N=CH—, —CH=N—, or —N=CH—, the most preferably a single bond or —C≡C—.

In general formula (I), n1 denotes, preferably, an integer of 1 to 3, more preferably an integer of 1 or 2. It is particularly preferred that n1 be 1.

For the compound's stability, it is preferred that no sulfur atoms and/or no oxygen and sulfur atoms be bound directly to one another in general formula (I).

As stated, n1 denotes an integer of 1 to 3. This means the compound represented by general formula (I) contains three or more ring units (single or fused rings) in its structure. In particular, a compound as a whole having a rod-shaped molecular structure formed by ring units linked together has improved liquid crystallinity and an increased Tni. Giving such a structure therefore helps extend the compound's nematic range effectively, but does not prevent the compound from dissolving well when it is added to a liquid-crystal composition. The π electrons in the ring units, furthermore, may conjugate and spread over the entire compound by travelling across the rings directly or through linking group(s). If this occurs, it increases the compound's Δn effectively and provides the great advantage that the compound will exhibit a large dielectric anisotropy in the radio frequency range.

More preferably, the compound represented by general formula (I) is a compound represented by general formula (I-i) for the compound's nematic range, compatibility with liquid-crystal compositions, refractive-index anisotropy, dielectric anisotropy, and voltage holding ratio, ease of synthesis, and availability of raw materials:

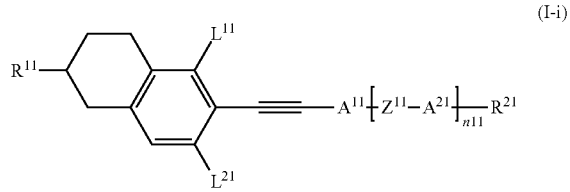

(I-i)

(where R$^{11}$ on each occurrence independently denotes a hydrogen atom or a C1 to C20 linear or branched alkyl group, the alkyl group optionally having any hydrogen atom therein replaced with a halogen atom and optionally having one —CH$_2$— therein, or each of two or more independently, replaced with —O—, —S—, —CH=CH—, —CF=CF—, or —C≡C—;

R$^{21}$ denotes a fluorine atom, a chlorine atom, a nitro group, a cyano group, an isocyano group, or a C1 to C20 linear or C3 to C20 branched or cyclic alkyl group, the alkyl group optionally having any hydrogen atom therein replaced with a fluorine atom and optionally having one —CH$_2$— therein, or each of two or more independently, replaced with —O—, —S—, —CH=CH—, —CF=CF—, or —C≡C—;

A$^{11}$ and A$^{21}$ each independently denote a 1,4-cyclohexylene, tetrahydropyrane-2,5-diyl, dioxane-2,5-diyl, 1,4-phenylene, naphthalene-2,6-diyl, naphthalene-1,4-diyl, 5,6,7,8-tetrahydronaphthalene-1,4-diyl, phenanthrene-2,7-diyl, benzothiophene-2,5-diyl, benzothiophene-2,6-diyl, benzothiazole-2,5-diyl, benzothiazole-2,6-diyl, dibenzothiophene-3,7-diyl, dibenzothiophene-2,6-diyl, or thieno[3,2-b]thiophene-2,5-diyl group, multiple A$^{21}$s may be the same or different, and the groups A$^{11}$ and A$^{21}$ may be unsubstituted or substituted with one or more substituents L$^{31}$;

L$^{11}$ and L$^{21}$ each independently denote a hydrogen atom, a fluorine atom, a chlorine atom, or a C1 to C20 linear or C3 to C20 branched or cyclic alkyl group, the alkyl group optionally having any hydrogen atom therein replaced with a fluorine atom and optionally having one —CH$_2$— therein, or each of two or more independently, replaced with —O—, —S—, —CH=CH—, —CF=CF—, or —C≡C—;

L$^{31}$ on each occurrence independently denotes a fluorine atom, a chlorine atom, or a C1 to C20 linear or C3 to C20 branched or cyclic alkyl group, the alkyl group optionally having any hydrogen atom therein replaced with a fluorine atom and optionally having one —CH$_2$— therein, or each of two or more independently, replaced with —O—, —S—, —CH=CH—, —CF=CF—, or —C≡C—, and multiple L$^{31}$s may be the same or different;

Z$^{11}$ on each occurrence independently denotes a single bond, —OCH$_2$—, —CH$_2$O—, —CH$_2$CH$_2$—, —CF$_2$O—, —OCF$_2$—, —CH=CH—, —CH=N—, —N=CH—, —CH=N—N=CH—, —CF=CF—, or —C≡C—, multiple Z$^{11}$s may be the same or different, and at least one of the Z$^{11}$s, or the Z$^{11}$ if there is only one Z$^{11}$, denotes a group other than a single bond; and n11 denotes an integer of 1 to 3), even more preferably a compound represented by general formula (I-ii):

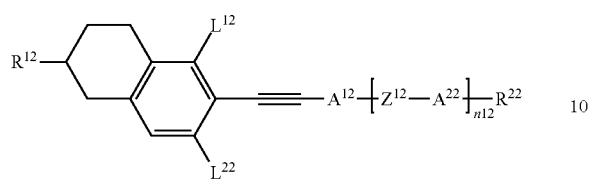
(I-ii)

(where $R^{12}$ denotes a C1 to C12 linear or branched alkyl group, the alkyl group optionally having any hydrogen atom therein replaced with a fluorine atom and optionally having one —$CH_2$— therein, or each of two or more independently, replaced with —O—, —CH=CH—, or —C≡C—;

$R^{22}$ denotes a fluorine atom, a cyano group, or a C1 to C10 linear or C3 to C10 branched or cyclic alkyl group, the alkyl group optionally having any hydrogen atom therein replaced with a fluorine atom and optionally having —$CH_2$-(s) therein replaced with —O—;

$A^{12}$ and $A^{22}$ each independently denote a group selected from formulae (A-ii-1) to (A-ii-17), and multiple $A^{22}$s may be the same or different:

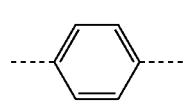
(A-ii-1)

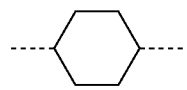
(A-ii-2)

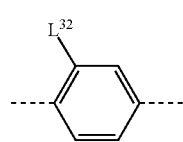
(A-ii-3)

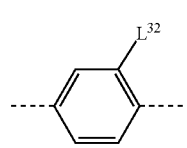
(A-ii-4)

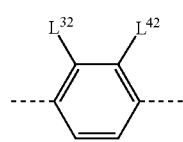
(A-ii-5)

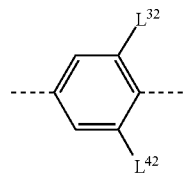
(A-ii-6)

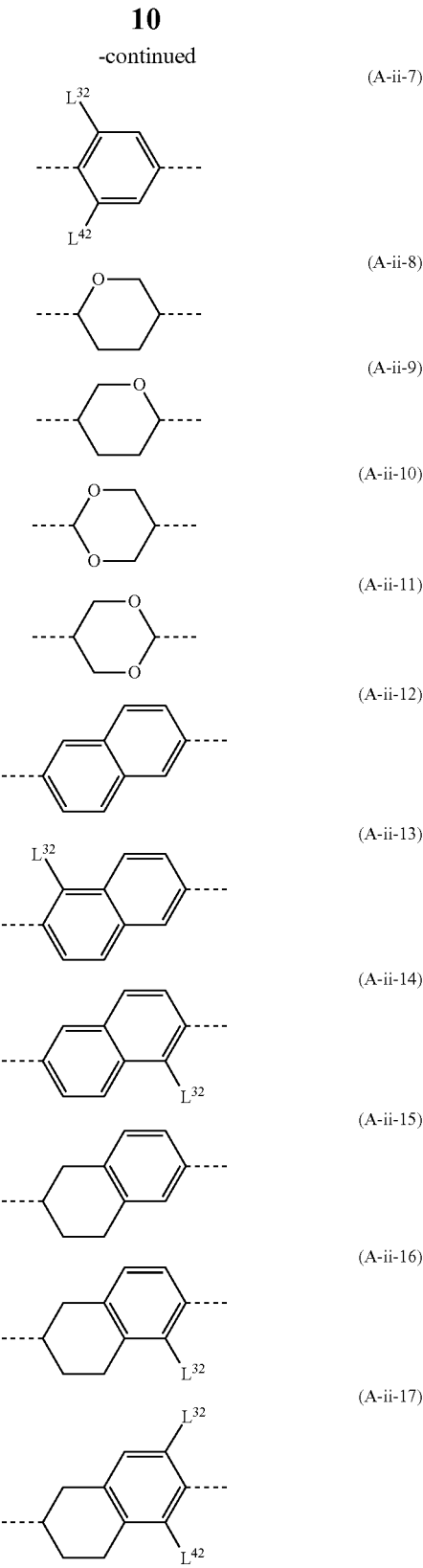

(where the broken lines represent binding sites, and a multiple number of $L^{32}$s and $L^{42}$s may be the same or different);

$L^{12}$, $L^{22}$, $L^{32}$, and $L^{42}$ each independently denote a hydrogen atom, a fluorine atom, or a C1 to C10 linear or C3 to C10 branched or cyclic alkyl group, the alkyl group optionally having any hydrogen atom therein replaced with a fluorine atom and optionally having —CH$_2$-(s) therein replaced with —O—;

$Z^{12}$ on each occurrence independently denotes —CH=CH—, —CH=N—, —N=CH—, —CH=N—N=CH—, —CF=CF—, or —C≡C—, and multiple $Z^{12}$s may be the same or different; and n12 denotes an integer of 1 to 3).

Specific examples of compounds represented by general formula (I) include the compounds represented by formulae (I-1) to (I-25).

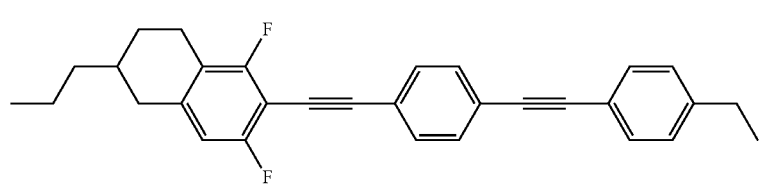
(I-1)

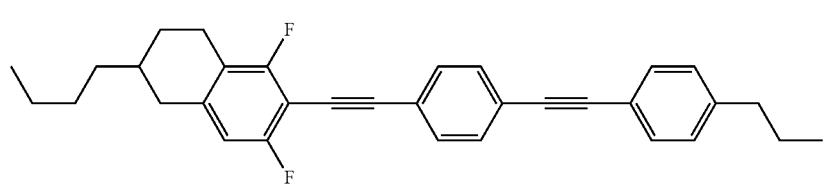
(I-2)

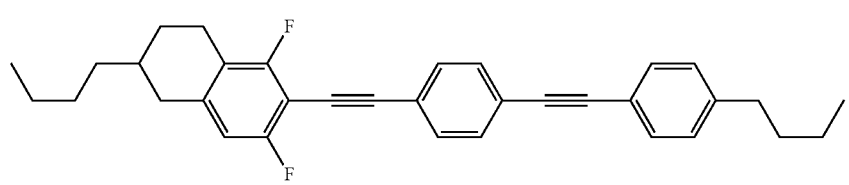
(I-3)

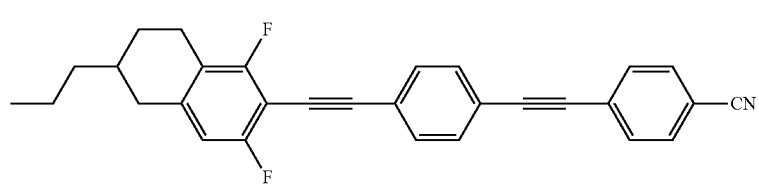
(I-4)

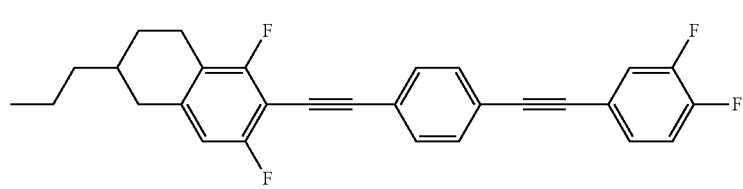
(I-5)

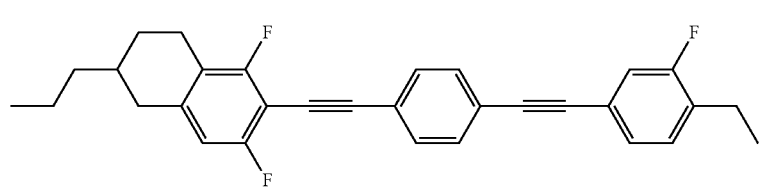
(I-6)

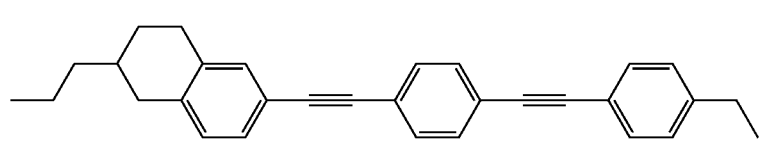
(I-7)

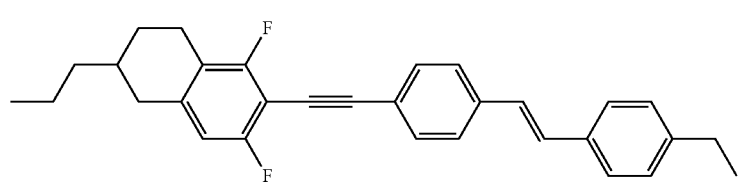
(I-8)

(I-9) 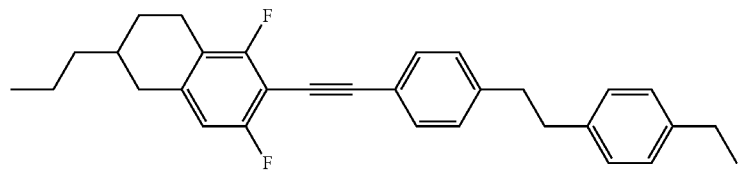
(I-10) 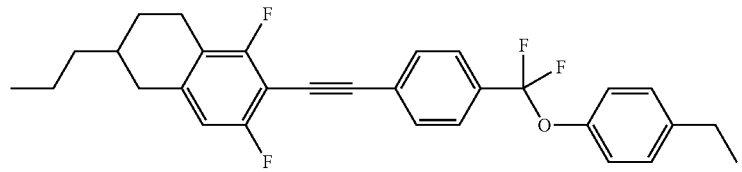
(I-11) 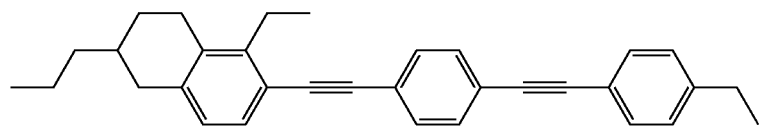
(I-12) 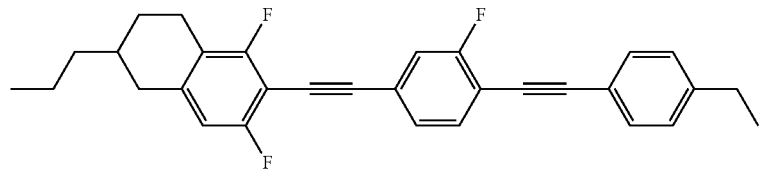
(I-13) 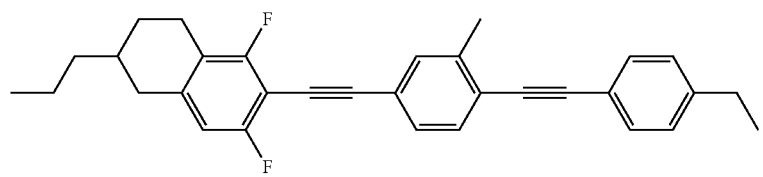
(I-14) 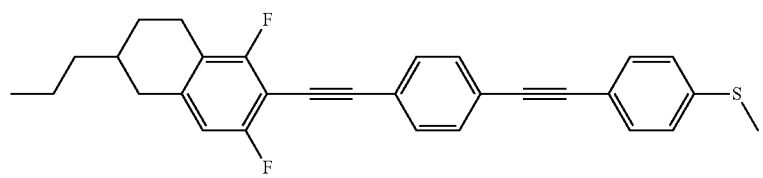
(I-15) 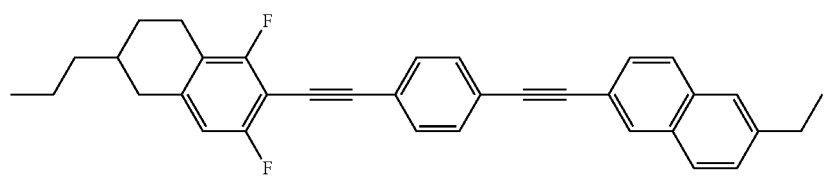
(I-16) 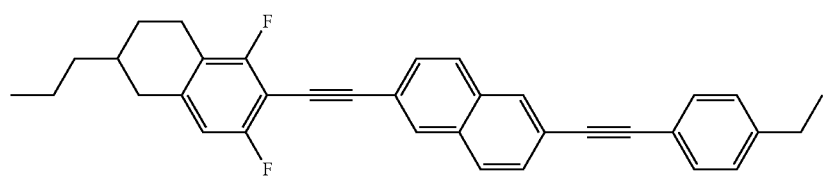
(I-17) 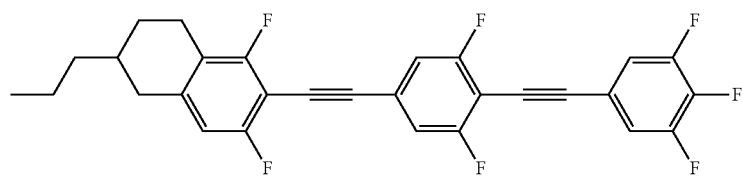

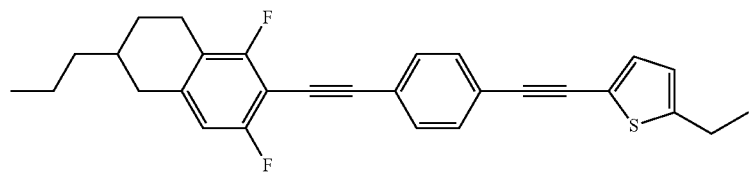
(I-18)
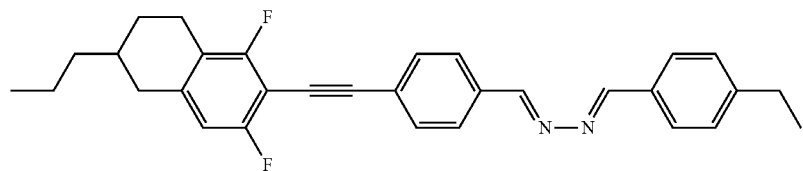
(I-19)
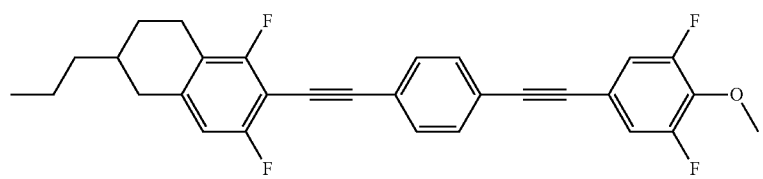
(I-20)
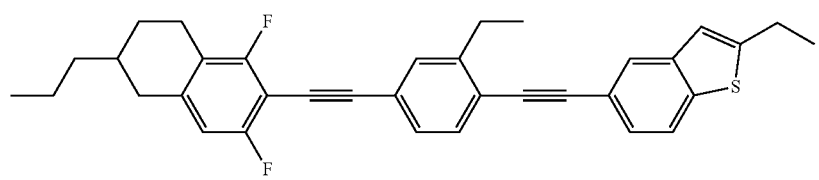
(I-21)
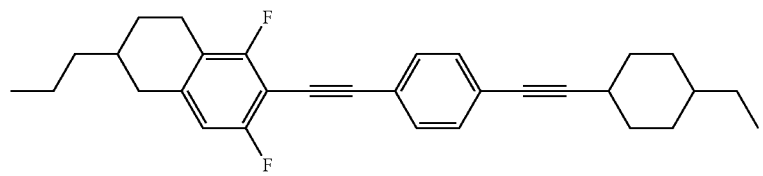
(I-22)
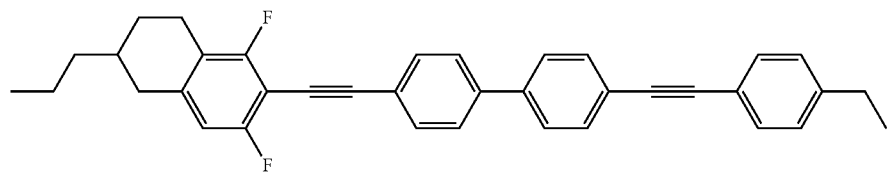
(I-23)
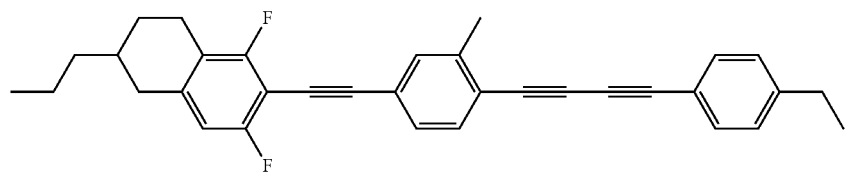
(I-24)
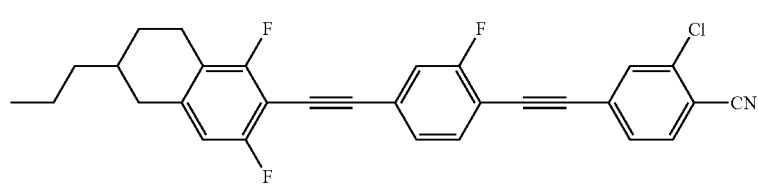
(I-25)

A compound according to the disclosure can be produced by the following processes.

Process 1: Production of a Compound of Formula (s-5)

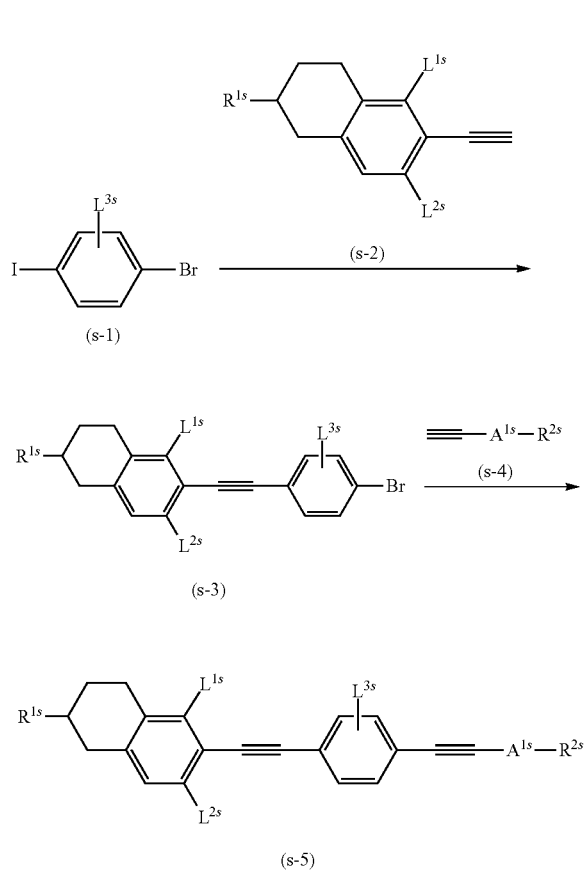

(In the formulae, $R^{1s}$, $R^{2s}$, $A^{1s}$, $L^{1s}$, $L^{2s}$, and $L^{3s}$ have the same meaning as $R^1$, $R^2$, $A^1$, $L^1$, $L^2$, and $L^3$, respectively, in general formula (I).)

Reacting a compound represented by general formula (s-1) with a compound represented by general formula (s-2) gives a compound represented by general formula (s-3). An example of a reaction method is the Sonogashira coupling, a coupling reaction performed using palladium and copper catalysts with a base. Specific examples of palladium catalysts include [1,1'-bis(diphenylphosphino)ferrocene]palladium(II) dichloride, palladium(II) acetate, dichlorobis[di-tert-butyl(p-dimethylaminophenyl)phosphino]palladium(II), dichlorobis(triphenylphosphine)palladium(II), and tetrakis(triphenylphosphine)palladium(0). Palladium acetate (II) used as a metal catalyst may have a ligand added thereto, such as triphenylphosphine or 2-dicyclohexylphosphino-2',4',6'-triisopropylbiphenyl. A specific example of a copper catalyst is copper(I) iodide. A specific example of a base is triethylamine.

Reacting the compound represented by general formula (s-3) with a compound represented by general formula (s-4) gives a compound represented by general formula (s-5). An example of a reaction method is the Sonogashira coupling, a coupling reaction performed using palladium and copper catalysts with a base. Specific examples of palladium catalysts, a copper catalyst, and a base are the same as listed above.

Process 2: Production of a Compound of Formula (s-10)

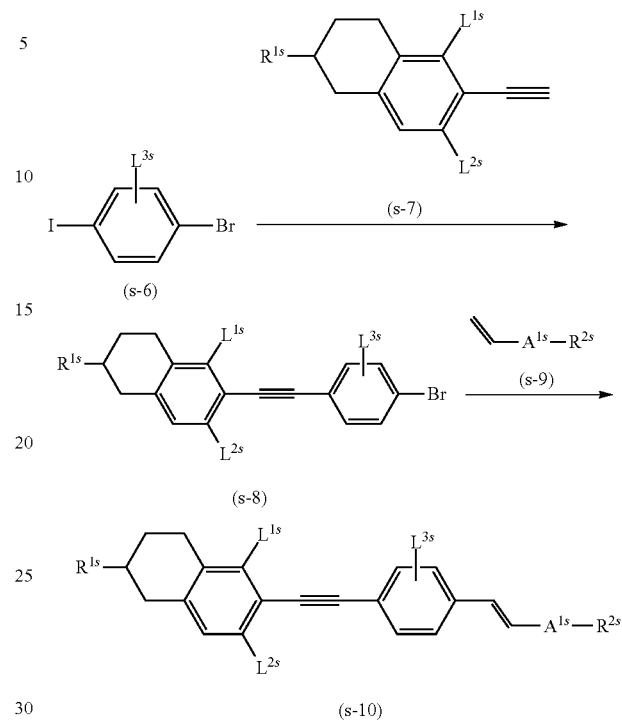

(In the formulae, $R^{1s}$, $R^{2s}$, $A^{1s}$, $L^{1s}$, $L^{2s}$, and $L^{3s}$ have the same meaning as $R^1$, $R^2$, $A^1$, $L^1$, $L^2$, and $L^3$, respectively, in general formula (I).)

Reacting a compound represented by general formula (s-6) with a compound represented by general formula (s-7) gives a compound represented by general formula (s-8). An example of a reaction method is the Sonogashira coupling, a coupling reaction performed using palladium and copper catalysts with a base. Specific examples of palladium catalysts, a copper catalyst, and a base are the same as listed above.

Reacting the compound represented by general formula (s-8) with a compound represented by general formula (s-9) gives a compound represented by general formula (s-10). An example of a reaction method is the Heck reaction, which is performed using a palladium catalyst with a base. Specific examples of palladium catalysts and a base are the same as listed above.

Process 3: Production of a Compound of Formula (s-15)

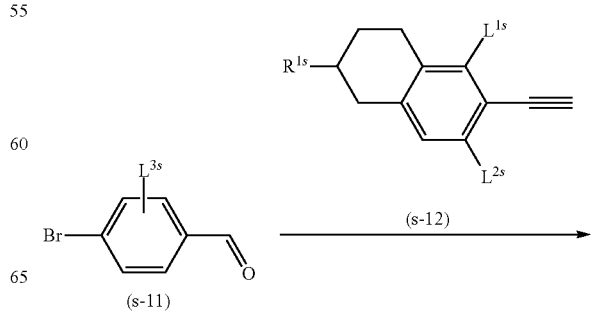

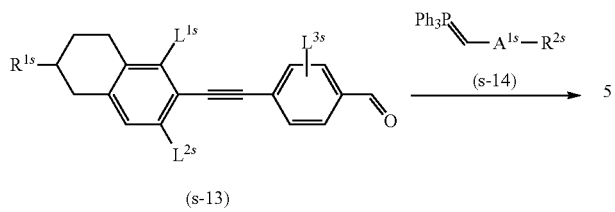

(s-13)

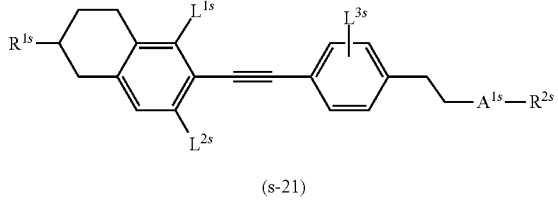

(s-21)

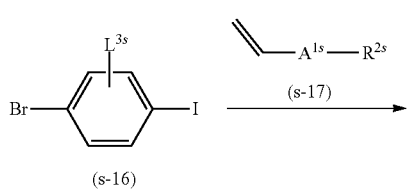

(s-15)

(In the formulae, $R^{1s}$, $R^{2s}$, $A^{1s}$, $L^{1s}$, $L^{2s}$, and $L^{3s}$ have the same meaning as $R^1$, $R^2$, $A^1$, $L^1$, $L^2$, and $L^3$, respectively, in general formula (I).)

Reacting a compound represented by general formula (s-11) with a compound represented by general formula (s-12) gives a compound represented by general formula (s-13). An example of a reaction method is the Sonogashira coupling, a coupling reaction performed using palladium and copper catalysts with a base. Specific examples of palladium catalysts, a copper catalyst, and a base are the same as listed above.

Reacting the compound represented by general formula (s-13) with a compound represented by general formula (s-14) gives a compound represented by general formula (s-15).

An example of a reaction method is the Wittig reaction.

Process 4: Production of a Compound of Formula (s-21)

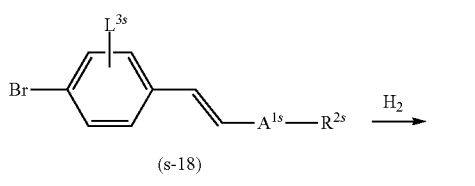

(s-16)

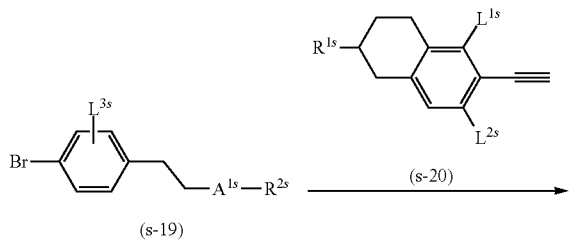

(In the formulae, $R^{1s}$, $R^{2s}$, $A^{1s}$, $L^{1s}$, $L^{2s}$, and $L^{3s}$ have the same meaning as $R^1$, $R^2$, $A^1$, $L^1$, $L^2$, and $L^3$, respectively, in general formula (I).)

Reacting a compound represented by general formula (s-16) with a compound represented by general formula (s-17) gives a compound represented by general formula (s-18). An example of a reaction method is the Heck reaction, which is performed using a palladium catalyst and a base. Specific examples of palladium catalysts and a base are the same as listed above.

Reacting the compound represented by general formula (s-18) with hydrogen gives a compound represented by general formula (s-19). An example of a reaction method is hydrogenation in the presence of a metal catalyst. A specific example of a metal catalyst is 10% palladium on carbon.

Reacting the compound represented by general formula (s-19) with a compound represented by general formula (s-20) gives a compound represented by general formula (s-21). An example of a reaction method is the Sonogashira coupling, a coupling reaction performed using palladium and copper catalysts with a base. Specific examples of palladium catalysts, a copper catalyst, and a base are the same as listed above.

In each reaction step, different reaction conditions may also be used. Examples of such reaction conditions include those found in literature such as *The Series of Experimental Chemistry* (in Japanese, ed. the Chemical Society of Japan, Maruzen Publishing Co., Ltd.), *Organic Syntheses* (A John Wiley & Sons, Inc., Publication), *Beilstein Handbook of Organic Chemistry* (Beilstein-Institut fuer Literatur der Organischen Chemie, Springer-Verlag Berlin and Heidelberg GmbH & Co. K), and *Fiesers' Reagents for Organic Synthesis* (John Wiley & Sons, Inc.) and those listed in databases such as SciFinder (Chemical Abstracts Service, the American Chemical Society) and Reaxys (Elsevier Ltd.).

Each reaction step may optionally include protecting functional group(s). Examples of protective groups include those listed in Greene's Protective Groups in Organic Synthesis (Fourth Edition) (Peter G. M. Wuts and Theodora W. Greene, A John Wiley & Sons, Inc., Publication).

Each reaction step may optionally include purification. Examples of purification methods include chromatography, recrystallization, distillation, sublimation, reprecipitation, adsorption, and a separatory funnel operation. Specific examples of purifying agents include silica gel, alumina, and activated charcoal.

Preferably, the compound represented by general formula (I) is used by addition to a liquid-crystal composition. The liquid-crystal composition may contain one compound represented by general formula (I) or may contain multiple compounds represented by general formula (I). Preferably, the total percentage of compounds represented by general formula (I) in the liquid-crystal composition according to the disclosure is 5% by mass or more, more preferably 10% by mass or more and 95% by mass or less, even more preferably 15% by mass or more and 90% by mass or less, in particular 20% by mass or more and 85% by mass or less. If the liquid-crystal composition contains one compound represented by general formula (I), the "total percentage of compounds represented by general formula (I)" refers to the percentage of the compound represented by general formula (I). If the liquid-crystal composition contains multiple compounds represented by general formula (I), this term refers to the total percentage of the compounds represented by general formula (I).

Preferably, the liquid-crystal composition containing compound(s) represented by general formula (I) has a refractive-index anisotropy (Δn) of 0.15 or more and 1.00 or less. For the liquid-crystal composition's nematic range, drive voltage, rotational viscosity, and elastic modulus, it is more preferred that the refractive-index anisotropy (Δn) be 0.20 or more and 0.95 or less, even more preferably 0.25 or more and 0.90 or less, still more preferably 0.30 or more and 0.85 or less, in particular 0.35 or more and 0.80 or less.

If a liquid-crystal composition containing compound(s) represented by general formula (I) is used in an RF phase shifter, a phased-array antenna, an image recognition device, a distance meter, a liquid-crystal display, a liquid-crystal lens, or a birefringent lens for 3D image display, it is preferred that the liquid-crystal composition containing compound(s) represented by general formula (I) have a dielectric anisotropy at 1 kHz (Δε (1 kHz)) of 2 or more and 60 or less. For the liquid-crystal composition's nematic range, storage stability, weatherability, drive voltage, rotational viscosity, and elasticity, it is preferred that the dielectric anisotropy at 1 kHz (Δε (1 kHz)) be 2.5 or more and 50 or less, more preferably 3 or more and 40 or less, in particular 3.5 or more and 30 or less.

Preferably, the liquid-crystal composition containing compound(s) represented by general formula (I) is used in an RF device. Preferably, the frequency range is from 1 MHz to 1 THz, more preferably from 1 GHz to 500 GHz, even more preferably from 2 GHz to 300 GHz, in particular from 5 GHz to 150 GHz. It is also preferred that the liquid-crystal composition containing compound(s) represented by general formula (I) be used in an image recognition device or distance meter, in particular a LiDAR (light detection and ranging or laser imaging, detection, and ranging) system. A preferred frequency range in this case is from 50 THz to 1000 THz, more preferably from 100 THz to 500 THz, in particular from 150 THz to 350 THz. That is, the LiDAR system preferably uses infrared light, more preferably infrared light with a wavelength of 800 to 2000 nm, in particular an infrared laser with a wavelength of 905 nm or 1550 nm. If the cost of the photodetector used or all-weather sensitivity is a priority, a 905-nm infrared laser is preferred. If safety for human vision is a priority, a 1550-nm infrared laser is preferred.

Preferably, the liquid-crystal composition containing compound(s) represented by general formula (I) contains a compound represented by general formula (IV):

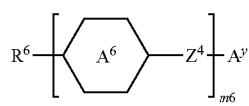

(VI)

(where $R^6$ denotes a C1 to C8 alkyl, C1 to C7 alkoxy, C2 to C8 alkenyl, or C2 to C7 alkenyloxy group;

$A^6$ denotes a group selected from formulae (A6-1) to (A6-8), and multiple $A^b$s may be the same or different:

(A6-1)

(A6-2)

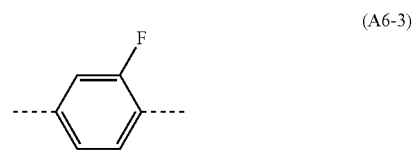
(A6-3)

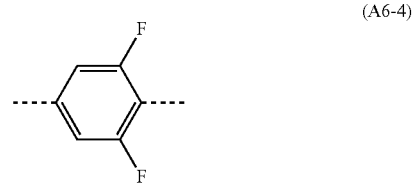
(A6-4)

(A6-5)

(A6-6)

(A6-7)

(A6-8)

(where the broken lines represent binding sites);

$Z^4$ denotes —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—OCO—, —CH$_2$CH$_2$—OCO—, —COO—CH$_2$—, —OCO—CH$_2$—, —CH$_2$—OCO—, —CH$_2$—OCO—, —CH=CH—, —N=N—, —CH=N—, —N=CH—, —CH=N—N=CH—, —CF=CF—, —C≡C—, or a single bond, and multiple $Z^4$s may be the same or different;

m6 denotes an integer of 1 to 4; and $A^y$ denotes a group selected from formulae (Ay-1) and (Ay-2):

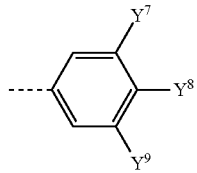
(Ay-1)

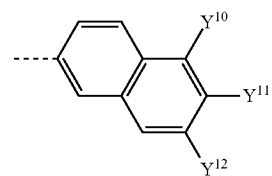
(Ay-2)

(where the broken line represents a binding site, $Y^7$, $Y^9$, $Y^{10}$, and $Y^{12}$ each independently denote a hydrogen, fluorine, or chlorine atom, and $Y^8$ and $Y^{11}$ each independently denote a fluorine atom, a chlorine atom, a cyano group, a thioisocyano group, a nitro group, a pentafluorosulfanyl group, or a C1 to C8 alkyl, C1 to C7 alkoxy, C2 to C8 alkenyl, or C2 to C7 alkenyloxy group having any hydrogen atom therein replaced with a fluorine atom and optionally having one —CH$_2$—, or each of two or more independently, replaced with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—)). For the liquid-crystal composition's nematic range, refractive-index anisotropy, dielectric anisotropy, rotational viscosity, and elasticity, it is preferred that the compound represented by general formula (VI) be a compound represented by general formula (VI-i):

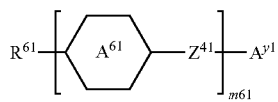
(VI-i)

(where $R^{61}$ denotes a C1 to C5 alkyl, C1 to C4 alkoxy, C2 to C5 alkenyl, or C2 to C4 alkenyloxy group;

$A^{61}$ denotes a group selected from formulae (A6-1) to (A6-6), given above, and multiple $A^{61}$s may be the same or different;

$Z^{41}$ denotes —OCH$_2$—, —CH$_2$O—, —CH$_2$CH$_2$—, —COO—, —OCO—, —CF$_2$O—, —OCF$_2$—, —CH=CH—COO—, —OCO—CH=CH—, —CH=CH—, —CH=N—N=CH—, —CF=CF—, —N=N—, —C≡C—, or a single bond, and multiple $Z^{41}$s may be the same or different;

m61 denotes an integer of 1 to 3; and $A^{y1}$ denotes a group selected from formulae (Ay-1-i) and (Ay-2-i)

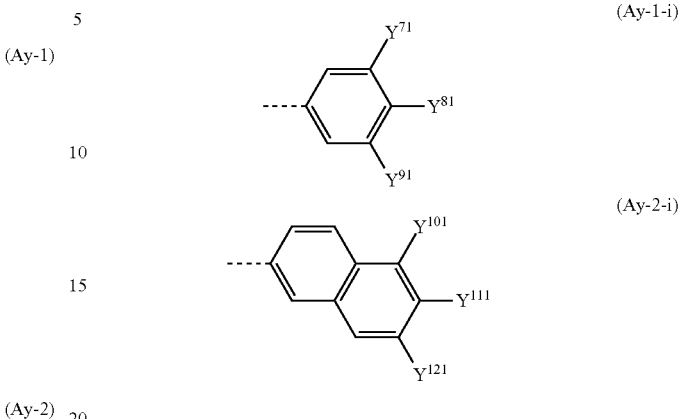
(Ay-1-i)

(Ay-2-i)

(where the broken line represents a binding site, $Y^{71}$, $Y^{91}$, $Y^{101}$, and $Y^{121}$ each independently denote a hydrogen, fluorine, or chlorine atom, and $Y^{81}$ and $Y^{111}$ each independently denote a fluorine atom, a chlorine atom, a cyano group, a thioisocyano group, a nitro group, a pentafluorosulfanyl group, or a C1 to C8 alkyl, C1 to C7 alkoxy, C2 to C8 alkenyl, or C2 to C7 alkenyloxy group optionally having any hydrogen atom therein replaced with a fluorine atom)). More preferably, the compound represented by general formula (VI) is a compound represented by general formula (VI-ii):

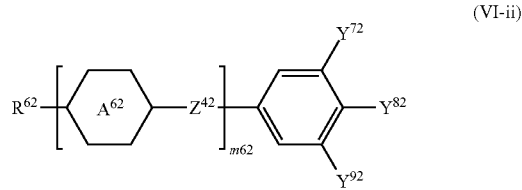
(VI-ii)

(where $R^{62}$ denotes a C1 to C5 alkyl, C1 to C4 alkoxy, C2 to C5 alkenyl, or C2 to C4 alkenyloxy group;

$A^{62}$ denotes a group selected from formulae (A6-1) to (A6-5), given above, and multiple $A^{62}$s may be the same or different;

$Z^{42}$ denotes —CF$_2$O—, —OCF$_2$—, —CH=CH—, —CF=CF—, —N=N—, —C≡C—, or a single bond, and multiple $Z^{42}$s may be the same or different;

m62 denotes 1, 2, or 3; and $Y^{72}$ and $Y^{92}$ each independently denote a hydrogen, fluorine, or chlorine atom, and $Y^{82}$ denotes a fluorine atom, a chlorine atom, a cyano group, a thioisocyano group, a nitro group, a pentafluorosulfanyl group, or a C1 to C8 alkyl, C1 to C7 alkoxy, C2 to C8 alkenyl, or C2 to C7 alkenyloxy group optionally having any hydrogen atom therein replaced with a fluorine atom). Even more preferably, the compound represented by general formula (VI) is a compound represented by general formula (VI-iii):

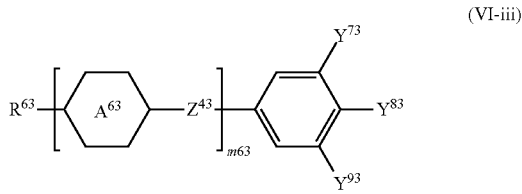
(VI-iii)

(where $R^{63}$ denotes a C1 to C5 alkyl, C1 to C4 alkoxy, or C2 to C5 alkenyl;

$A^{63}$ denotes a group selected from formulae (A6-1) to (A6-5), given above, and multiple $A^{63}$s may be the same or different;

$Z^{43}$ denotes —CF$_2$O—, —OCF$_2$—, —N=N—, —C≡C—, or a single bond, and multiple $Z^{43}$s may be the same or different;

m63 denotes 1, 2, or 3; and $Y^{73}$ and $Y^{93}$ each independently denote a hydrogen, fluorine, or chlorine atom, and $Y^{83}$ denotes a fluorine atom, a chlorine atom, a cyano group, or a thioisocyano group). It is particularly preferred that the compound represented by general formula (VI) be a compound represented by any of general formulae (VI-iv-1) to (VI-iv-21):

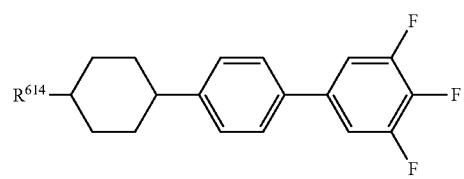
(VI-iv-1)

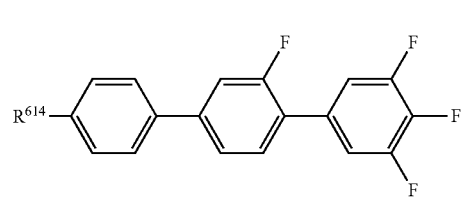
(VI-iv-2)

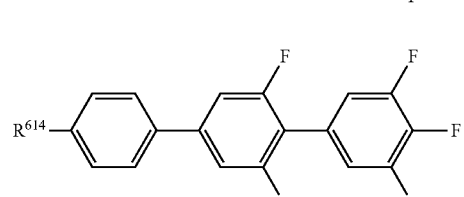
(VI-iv-3)

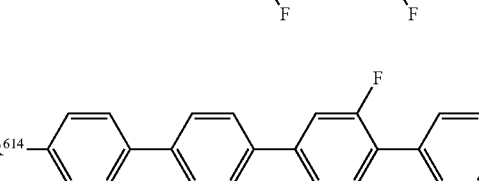
(VI-iv-4)

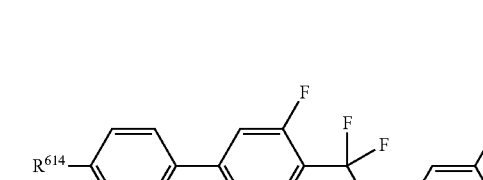
(VI-iv-5)

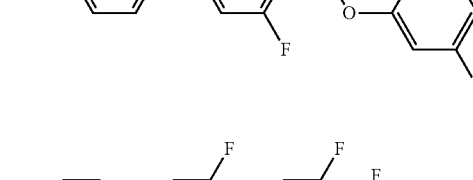
(VI-iv-6)

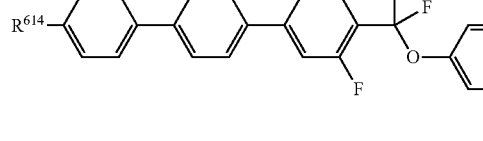

-continued

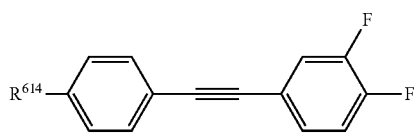
(VI-iv-7)

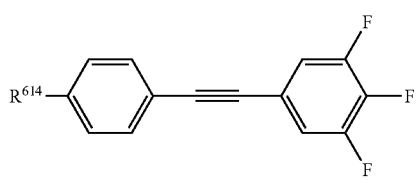
(VI-iv-8)

(VI-iv-9)

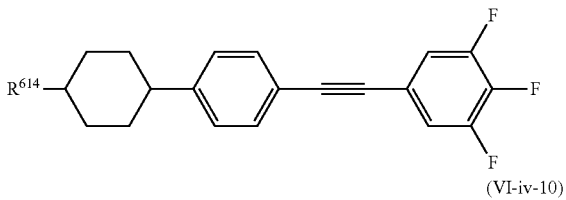
(VI-iv-10)

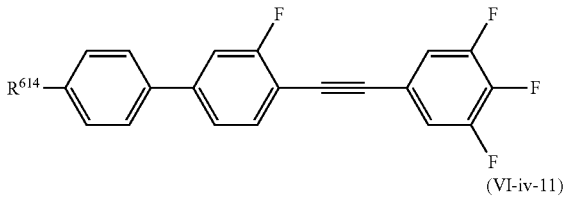
(VI-iv-11)

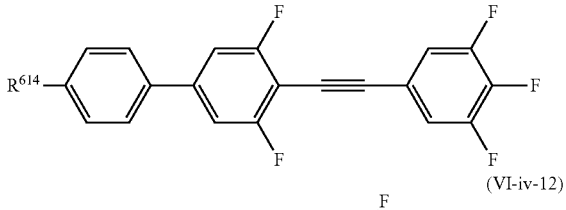
(VI-iv-12)

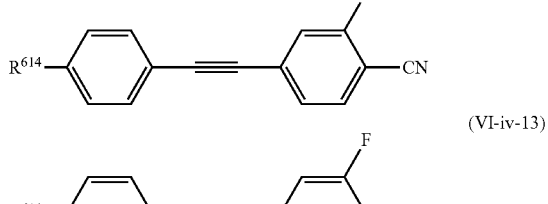
(VI-iv-13)

(VI-iv-14)

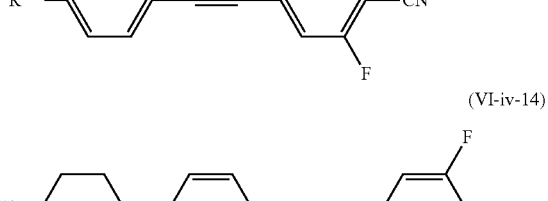
(VI-iv-15)

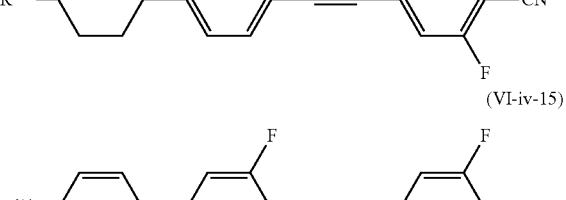

-continued

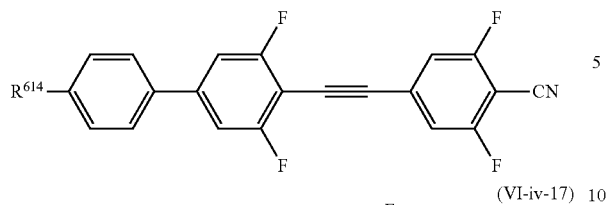
(VI-iv-16)

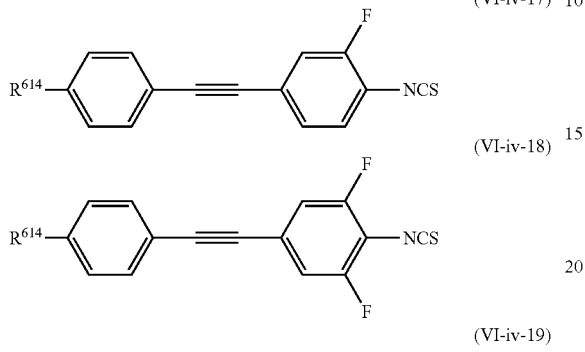
(VI-iv-17)
(VI-iv-18)
(VI-iv-19)

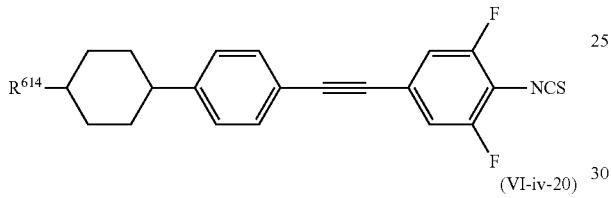
(VI-iv-20)

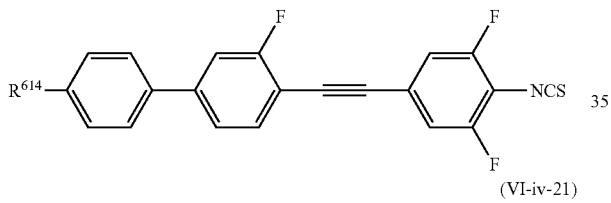
(VI-iv-21)

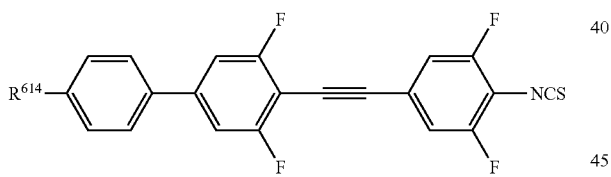

(where R$^{614}$ denotes a C1 to C5 alkyl, C1 to C4 alkoxy, or C2 to C5 alkenyl group).

The liquid-crystal composition containing compound(s) represented by general formula (I) may contain a compound represented by general formula (III):

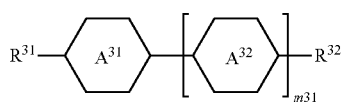
(III)

(where R$^{31}$ and R$^{32}$ each independently denote a C1 to C8 alkyl, C1 to C7 alkoxy, C2 to C8 alkenyl, or C2 to C7 alkenyloxy group;

A$^{31}$ and A$^{32}$ each independently denote a group selected from formulae (A3-1) to (A3-8), and multiple A$^{32}$s may be the same or different:

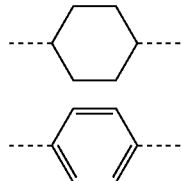 (A3-1)

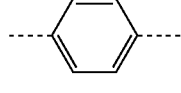 (A3-2)

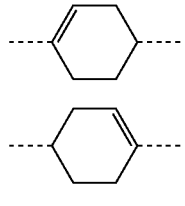 (A3-3)

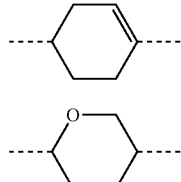 (A3-4)

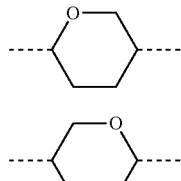 (A3-5)

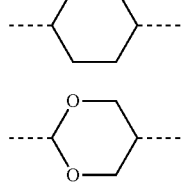 (A3-6)

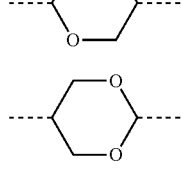 (A3-7)

(A3-8)

(where the broken lines represent binding sites); and m31 denotes an integer of 1 to 4). For the liquid-crystal composition's nematic range, refractive-index anisotropy, dielectric anisotropy, rotational viscosity, and elasticity, it is preferred that the compound represented by general formula (III) be a compound represented by general formula (III-i):

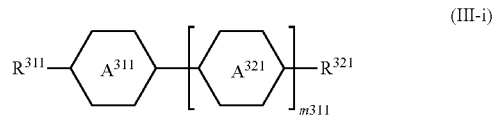
(III-i)

(where R$^{311}$ and R$^{321}$ each independently denote a C1 to C5 alkyl, C1 to C4 alkoxy, C2 to C5 alkenyl, or C2 to C4 alkenyloxy group;

A$^{311}$ and A$^{321}$ each independently denote a group selected from formulae (A31-1) to (A31-6), and multiple A$^{321}$s may be the same or different:

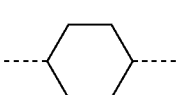 (A31-1)

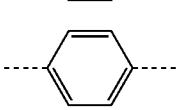 (A31-2)

-continued

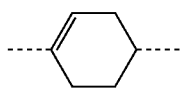
(A31-3)

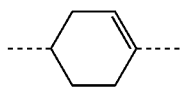
(A31-4)

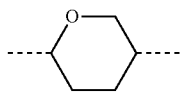
(A31-5)

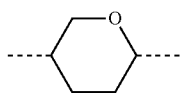
(A31-6)

(where the broken lines represent binding sites); and m311 denotes an integer of 1 to 3). More preferably, the compound represented by general formula (III) is a compound represented by general formula (III-ii):

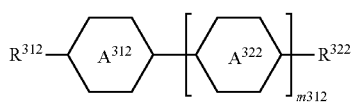
(III-ii)

(where $R^{312}$ and $R^{322}$ each independently denote a C1 to C5 alkyl, C1 to C4 alkoxy, C2 to C5 alkenyl, or C2 to C4 alkenyloxy group;

$A^{312}$ and $A^{322}$ each independently denote a group selected from formulae (A32-1) to (A32-4), and multiple $A^{322}$s may be the same or different:

(A32-1)

(A32-2)

(A32-3)

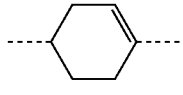
(A32-4)

(where the broken lines represent binding sites); and m312 denotes 1 or 2). Even more preferably, the compound represented by general formula (III) is a compound represented by general formula (III-iii):

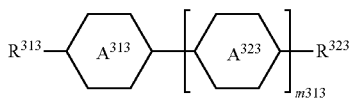
(III-iii)

(where $R^{313}$ and $R^{323}$ each independently denote a C1 to C5 alkyl, C1 to C4 alkoxy group, or a C2 to C5 alkenyl group;

$A^{313}$ and $A^{323}$ each independently denote a group selected from formulae (A33-1) and (A33-2), and multiple $A^{323}$s may be the same or different:

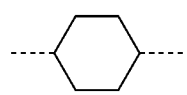
(A33-1)

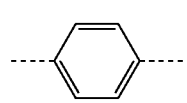
(A33-2)

(where the broken lines represent binding sites); and m313 denotes 1 or 2).

To be specific, it is particularly preferred that the compound represented by general formula (III) be a compound represented by any of general formulae (III-iv-1) to (III-iv-10):

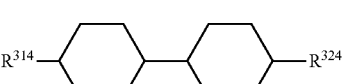
(III-iv-1)

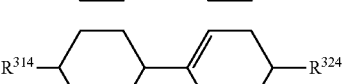
(III-iv-2)

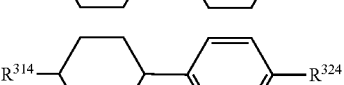
(III-iv-3)

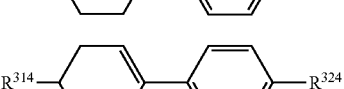
(III-iv-4)

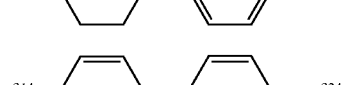
(III-iv-5)

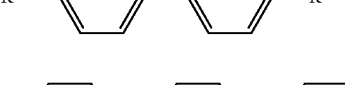
(III-iv-6)

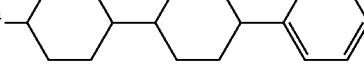
(III-iv-7)

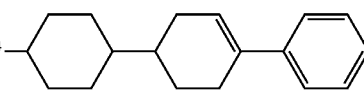
(III-iv-8)

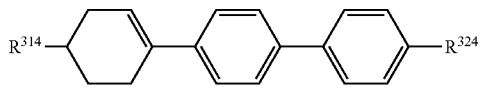
(III-iv-9)

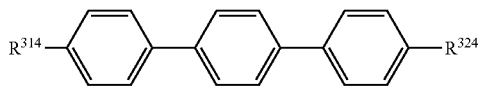
(III-iv-10)

(where $R^{314}$ and $R^{324}$ each independently denote a C1 to C5 alkyl, C1 to C4 alkoxy, or C2 to C5 alkenyl group).

The compound represented by general formula (I) may be used by addition to a liquid-crystal composition having a neutral or negative dielectric anisotropy (Δε). In that case, it is preferred that the liquid-crystal composition containing compound(s) represented by general formula (I) have a dielectric anisotropy of (Δε) of −20 or more and 2 or less. For the liquid-crystal composition's nematic range, storage stability, weatherability, drive voltage, rotational viscosity, and elasticity, it is preferred that the dielectric anisotropy (Δε) be −15 or more and 1.5 or less, more preferably −10 or more and 1 or less, in particular −5 or more and 0.5 or less.

If the dielectric anisotropy (Δε) of the liquid-crystal composition containing compound(s) represented by general formula (I) is neutral or negative, the liquid-crystal composition may contain a compound represented by general formula (IV):

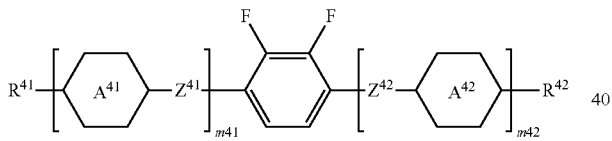
(IV)

(where $R^{41}$ and $R^{42}$ each independently denote a C1 to C8 alkyl, C1 to C7 alkoxy, C2 to C8 alkenyl, or C2 to C7 alkenyloxy group;

$A^{41}$ and $A^{42}$ each independently denote a group selected from formulae (A4-1) to (A4-11), multiple $A^{41}$s may be the same or different, and multiple $A^{42}$s may be the same or different:

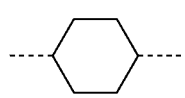
(A4-1)

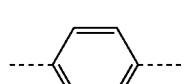
(A4-2)

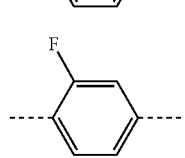
(A4-3)

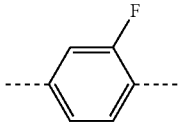
(A4-4)

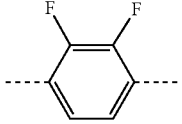
(A4-5)

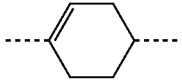
(A4-6)

(A4-7)

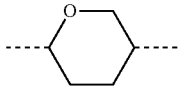
(A4-8)

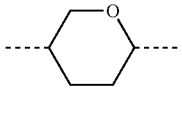
(A4-9)

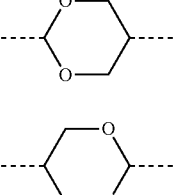
(A4-10)

(A4-11)

(where the broken lines represent binding sites);

$Z^{41}$ and $Z^{42}$ each independently denote —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—, —N═CH—, —CH═N—N═CH—, —CF═CF—, —C≡C—, or a single bond, multiple $Z^{41}$s may be the same or different, and multiple $Z^{42}$s may be the same or different;

m41 and m42 each independently denote an integer of 0 to 3, with m41+m42 denoting an integer of 1 to 3). For the liquid-crystal composition's nematic range, refractive-index anisotropy, dielectric anisotropy, rotational viscosity, and elasticity, it is preferred that the compound represented by general formula (IV) be a compound represented by general formula (IV-i):

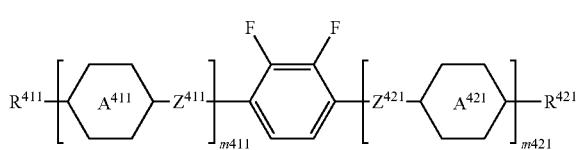

(IV-i)

(where $R^{411}$ and $R^{421}$ each independently denote a C1 to C5 alkyl, C1 to C4 alkoxy, C2 to C5 alkenyl, or C2 to C4 alkenyloxy group;

$A^{411}$ and $A^{421}$ each independently denote a group selected from formulae (A4-1) to (A4-9), given above, multiple $A^{411}$s may be the same or different, and multiple $A^{421}$s may be the same or different;

$Z^{411}$ and $Z^{421}$ each independently denote —OCH$_2$—, —CH$_2$O—, —CH$_2$CH$_2$—, —COO—, —OCO—, —CF$_2$O—, —OCF$_2$—, —CH=CH—COO—, —OCO—CH=CH—, —CH=CH—, —CH=N—N=CH—, —CF=CF—, —C≡C—, or a single bond, multiple $Z^{411}$s may be the same or different, and multipole $Z^{421}$s may be the same or different;

m411 and m421 each independently denote an integer of 0 to 3, with m411+m421 being an integer of 1 to 3). More preferably, the compound represented by general formula (IV) is a compound represented by general formula (IV-ii):

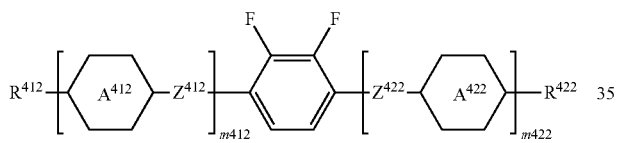

(IV-ii)

(where $R^{412}$ and $R^{422}$ each independently denote a C1 to C5 alkyl, C1 to C4 alkoxy, C2 to C5 alkenyl, or C2 to C4 alkenyloxy group;

$A^{412}$ and $A^{422}$ each independently denote a group selected from formulae (A4-1) to (A4-7), given above, multiple $A^{412}$s may be the same or different, and multiple $A^{422}$s may be the same or different;

$Z^{412}$ and $Z^{422}$ each independently denote —OCH$_2$—, —CH$_2$O—, —CH$_2$CH$_2$—, —COO—, —OCO—, —CF$_2$O—, —OCF$_2$—, or a single bond, and multiple $Z^{412}$s may be the same or different, and multiple $Z^{422}$s may be the same or different;

m412 and m422 each independently denote 0, 1, or 2, with m412+m422 being 1 or 2). Even more preferably, the compound represented by general formula (IV) is a compound represented by general formula (IV-iii):

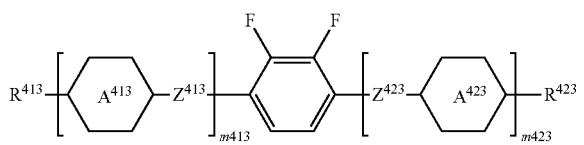

(IV-iii)

(where $R^{413}$ and $R^{423}$ each independently denote a C1 to C5 alkyl, C1 to C4 alkoxy, or C2 to C5 alkenyl group;

$A^{413}$ and $A^{423}$ each independently denote a group selected from formulae (A4-1) to (A4-5), given above, multiple $A^{413}$s may be the same or different, and multiple $A^{423}$s may be the same or different;

$Z^{413}$ and $Z^{423}$ each independently denote —OCH$_2$—, —CH$_2$O—, —CH$_2$CH$_2$—, or a single bond, multiple $Z^{413}$s may be the same or different, and multiple $Z^{423}$s may be the same or different;

m413 and m423 each independently denote 0, 1, or 2, with m413+m423 being 1 or 2). It is particularly preferred that the compound represented by general formula (IV) be a compound represented by any of general formulae (IV-iv-1) to (IV-iv-8):

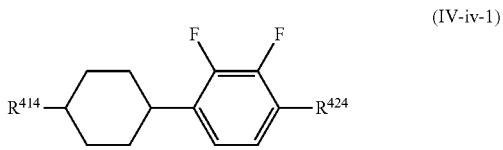

(IV-iv-1)

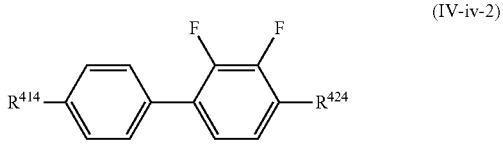

(IV-iv-2)

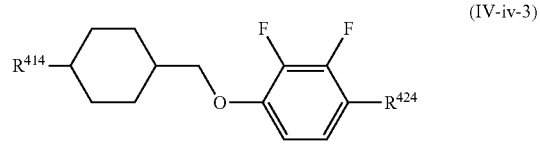

(IV-iv-3)

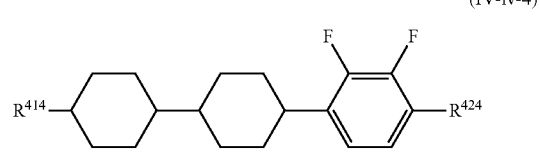

(IV-iv-4)

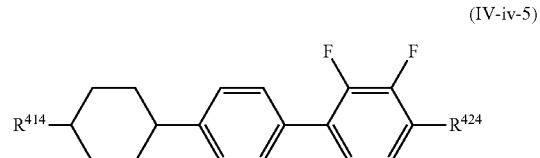

(IV-iv-5)

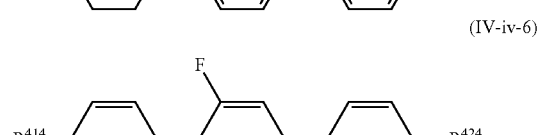

(IV-iv-6)

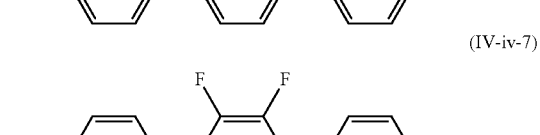

(IV-iv-7)

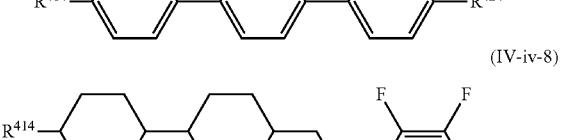

(IV-iv-8)

(where $R^{414}$ and $R^{424}$ each independently denote a C1 to C5 alkyl, C1 to C4 alkoxy, or C2 to C5 alkenyl group).

To the liquid-crystal composition containing compound(s) represented by general formula (I), stabilizer(s) may be added to improve its storage stability. Examples of stabilizers that can be used include hydroquinones, hydroquinone monoalkyl ethers, tert-butylcatechols, pyrogallols, thiophenols, nitro compounds, β-naphthylamines, β-naphthols, and nitroso compounds. Preferably, the stabilizer content is in the range of 0.005% by mass to 1% by mass, more preferably 0.02% by mass to 0.8% by mass, even more preferably 0.03% by mass to 0.5% by mass of the composition. One stabilizer may be used, or two or more stabilizers may be used in combination. An example of a stabilizer is a compound represented by general formula (X1):

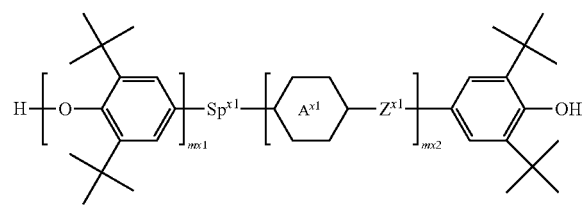

(X1)

(where $Sp^{x1}$ denotes a single bond or a C1 to C20 alkylene group optionally having one —$CH_2$— therein, or each of nonadjacent two or more independently, replaced with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—;

$A^{x1}$ denotes a group represented by formulae (Ax1-1) to (Ax1-8), and multiple $A^{x1}$s may be the same or different:

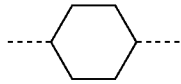

(Ax1-1)

(Ax1-2)

(Ax1-3)

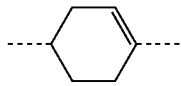

(Ax1-4)

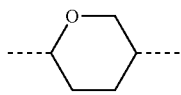

(Ax1-5)

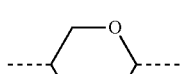

(Ax1-6)

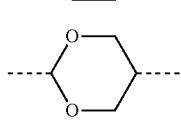

(Ax1-7)

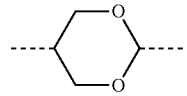

(Ax1-8)

(where the broken lines represent binding sites);

$Z^{x1}$ denotes —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—OCO—, —CH$_2$CH$_2$—OCO—, —COO—CH$_2$—, —OCO—CH$_2$—, —CH$_2$—OCO—, —CH$_2$—OCO—, —CH=CH—, —N=N—, —CH=N—, —N=CH—, —CH=N—N=CH—, —CF=CF—, —C≡C—, or a single bond, and multiple $Z^{x1}$s may be the same or different;

mx1 denotes 0 or 1; and mx2 denotes an integer of 0 to 4). For the voltage holding ratio and compatibility with the liquid-crystal composition, it is preferred that the compound represented by general formula (X1) be a compound represented by general formula (X1-i):

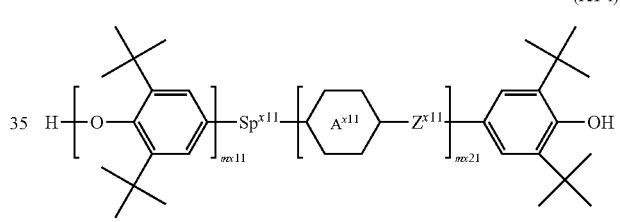

(X1-i)

(where $Sp^{x11}$ denotes a single bond or a C1 to C20 alkylene group optionally having one —$CH_2$— therein, or each of nonadjacent two or more independently, replaced with —O—, —OCO—, or —OCO—;

$A^{x11}$ denotes a group selected from formulae (Ax11-1) and (Ax11-2), and multiple $A^{x11}$s may be the same or different:

(Ax11-1)

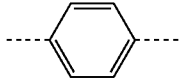

(Ax11-2)

(where the broken lines represent binding sites);

$Z^{x11}$ denotes —OCO—, —OCO—, —OCO—CH$_2$CH$_2$—, —CH$_2$CH$_2$—OCO—, or a single bond, and multiple $Z^{x11}$s may be the same or different;

mx11 denotes 0 or 1; and mx21 denotes 0 or 1). It is particularly preferred that the compound represented by general formula (X1) be a compound represented by any of general formulae (X1-ii-1) to (X1-ii-4):

(X1-ii-1)

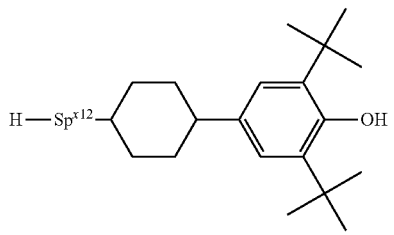

(X1-ii-2)

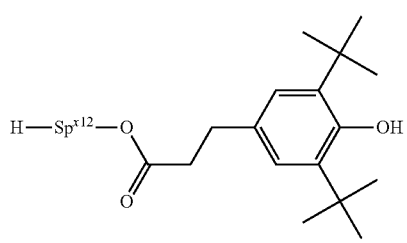

(X1-ii-3)

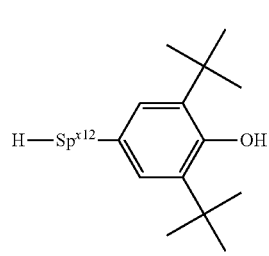

(X1-ii-4)

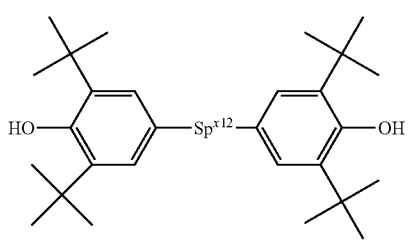

(where $Sp^{x12}$ denotes a C1 to C20 alkylene group or single bond).

Another example of a stabilizer is a compound represented by general formula (X2):

(X2)

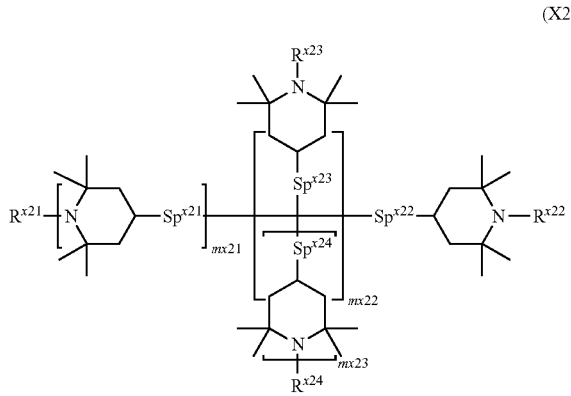

(where $R^{x21}$, $R^{x22}$, $R^{x23}$, and $R^{x24}$ each independently denote a hydrogen atom, an oxygen atom, a hydroxyl group, a C1 to C20 alkyl group, or a C1 to C20 alkoxy group;

$Sp^{x21}$, $Sp^{x22}$, $Sp^{x23}$, and $Sp^{x24}$ each independently denote a spacer group or a single bond;

mx21 denotes 0 or 1;

mx22 denotes 0 or 1; and mx23 denotes 0 or 1). For the voltage holding ratio and compatibility with the liquid-crystal composition, It is preferred that the compound represented by general formula (X2) be a compound represented by general formula (X2-i):

(X2-i)

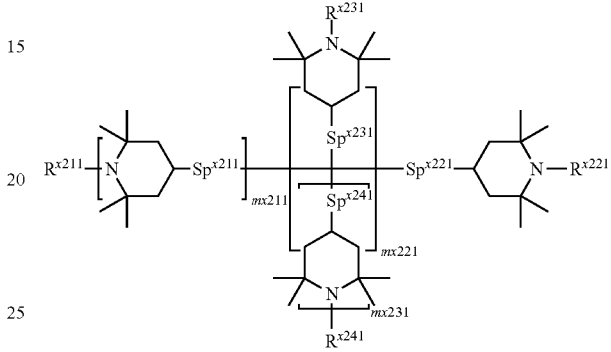

(where $R^{x211}$, $R^{x221}$, $R^{x231}$, and $R^{x241}$ each independently denote a hydrogen atom, an oxygen atom, a hydroxyl group, a C1 to C10 alkyl group, or a C1 to C10 alkoxy group;

$Sp^{x211}$, $Sp^{x221}$, $Sp^{x231}$, and $Sp^{x241}$ each independently denote a single bond or a C1 to C20 linear or branched alkylene group optionally having any hydrogen atom therein replaced with a fluorine atom and optionally having one —$CH_2$— therein, or each of nonadjacent two or more independently, replaced with —O—, —S—, —CO—, —COO—, —OCO—, —CO—S—, —S—CO—, —O—CO—O—, —CO—NH—, —NH—CO—, —CH=CH—, —CF=CF—, or —C≡C—;

mx211 denotes 0 or 1;

mx221 denotes 0 or 1; and mx231 denotes 0 or 1). Even more preferably, the compound represented by general formula (X2) is a compound represented by general formula (X2-ii):

(X2-ii)

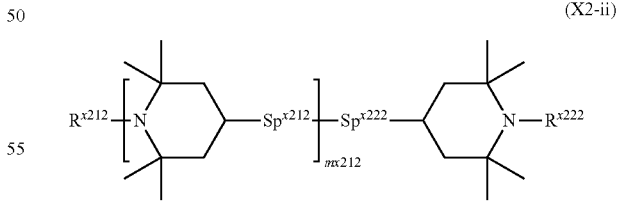

(where $R^{x212}$ and $R^{x222}$ each independently denote a hydrogen atom, a C1 to C10 alkyl group, or a C1 to C10 alkoxy group;

$Sp^{x212}$ and $Sp^{x222}$ each independently denote a single bond or a C1 to C10 linear alkylene group optionally having one —$CH_2$— therein, or each of nonadjacent two or more independently, replaced with —O—, —COO—, or —OCO; and mx212 denotes 0 or 1). It is particularly preferred that the compound represented by general formula (X2) be a compound represented by general formula (X2-iii):

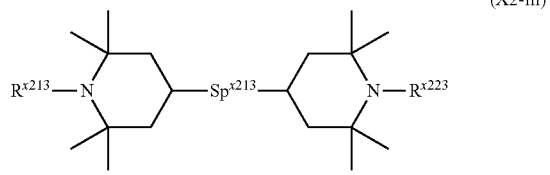
(X2-iii)

(where $R^{x213}$ and $R^{x223}$ each independently denote a hydrogen atom, a C1 to C10 alkyl group, or a C1 to C10 alkoxy group; and $Sp^{x213}$ denotes a C1 to C10 linear alkylene group optionally having one —CH$_2$— therein, or each of nonadjacent two or more independently, replaced with —COO— or —OCO—).

In the disclosure, the ring unit in a 1,4-cyclohexylene, decahydronaphthalene-2,6-diyl, or 1,3-dioxane-2,5-diyl group may be in trans or cis form. For liquid crystallinity, however, it is preferred that the trans isomer be predominant over the cis isomer. More preferably, the percentage of the trans isomer for that ring is 80% or more, even more preferably 90% or more, still more preferably 95% or more, in particular 98% or more. In the disclosure, the following notation (CY-1) represents the trans and/or cis isomer(s) of a 1,4-cyclohexylene group:

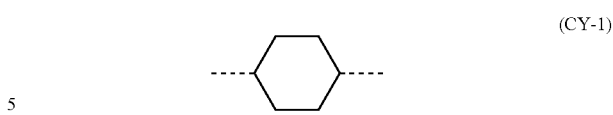
(CY-1)

(where the broken lines represent binding sites).

In the disclosure, furthermore, each element may be replaced with an isotope of the element.

EXAMPLES

The following further describes the disclosure by providing examples, although the disclosure is not limited to these examples. Any "%" mentioned in relation to the compositions of Examples and Comparative Examples below refers to "% by mass." In each step, it is preferred that any oxygen- and/or water-susceptible substance be handled in an inert gas, such as nitrogen or argon gas. The purity of the compounds was determined by UPLC (Waters ACQUITY UPLC; BEH C$_{18}$ (100×2.1 mm×1.7 μm); acetonitrile/water or 0.1% formic acid in acetonitrile/water; PDA; column temperature, 40° C.), GPC (Shimadzu HPLC Prominence; Shodex KF-801 (300 mm×8 mm×6 μm)+KF-802 (300 mm×8 mm×6 μm); tetrahydrofuran; RI; UV (254 nm); column temperature, 40° C.), GC (Agilent 6890A; J&W DB-1, 30 m×0.25 mm×0.25 μm; carrier gas, He; FID; 100° C. (1 min)→heating at 10° C./min→300° C. (12 min)), or $^1$H NMR (JEOL, 400 MHz).

Example 1: Production of the Compound of Formula (I-1)

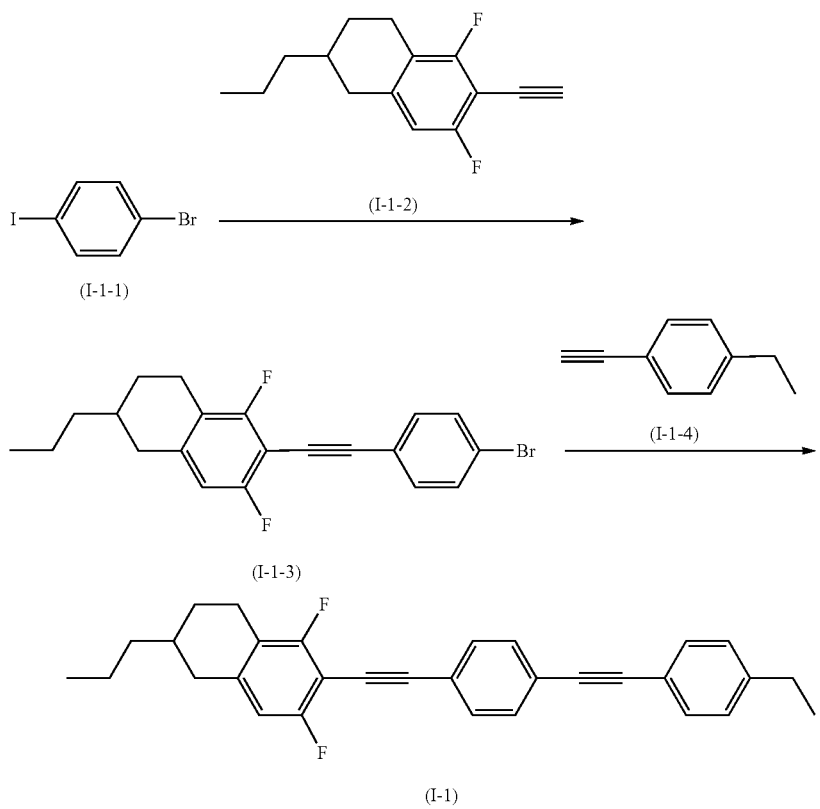

In a nitrogen atmosphere, 10.0 g of the compound represented by formula (I-1-1), 0.3 g of copper(I) iodide, 0.5 g of bis(triphenylphosphine)palladium(II) dichloride, 25 mL of triethylamine, and 50 mL of tetrahydrofuran were added to a reactor. A solution of 9.9 g of the compound represented by formula (I-1-2) in 50 mL of tetrahydrofuran was added dropwise with stirring at room temperature, followed by stirring at room temperature for 1 hour. The reaction solution was combined with 10% hydrochloric acid by pouring the acid into it. Extraction was carried out with toluene, and the organic layer was washed with brine. The solute was purified by column chromatography (silica gel and toluene) and recrystallization (toluene/hexane), giving 9.0 g of the compound represented by formula (I-1-3).

In a nitrogen atmosphere, 9.0 g of the compound represented by formula (I-1-3), 0.2 g of copper(I) iodide, 0.5 g of tetrakis(triphenylphosphine)palladium(0), 36 mL of trimethylamine, and 18 mL of N,N-dimethylformamide were added to a reactor. A solution of 3.6 g of the compound represented by formula (I-1-4) in 18 mL of N,N-dimethylformamide was added dropwise with heating at 75° C., followed by stirring at 75° C. for 2 hours. A solid collected by filtration was purified by recrystallization (toluene/hexane and acetone/methanol), giving 8.1 g of the compound represented by formula (I-1).

MS (EI): m/z=438

Example 2: Production of the Compound of Formula (I-2)

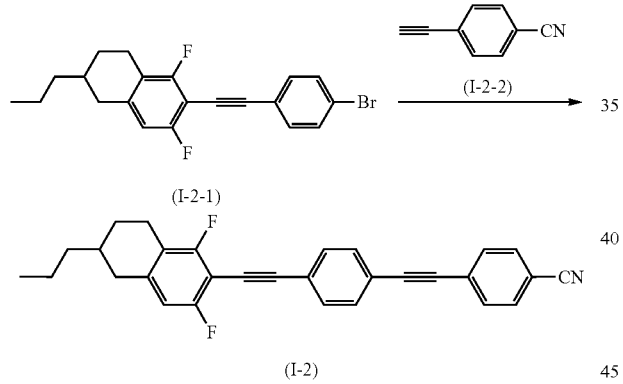

The compound represented by formula (I-2) was produced in the same way as in Example 1, except that the compound represented by formula (I-1-4) was replaced with the compound represented by formula (I-2-2).

MS (EI): m/z=435

Example 3: Production of the Compound of Formula (I-3)

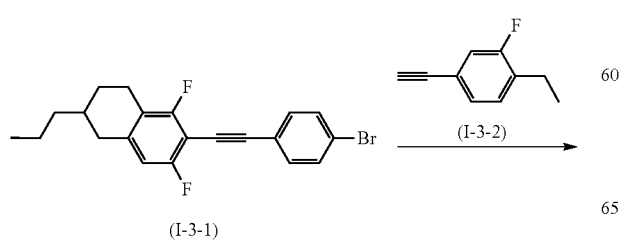

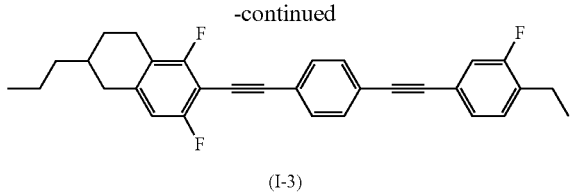

The compound represented by formula (I-3) was produced in the same way as in Example 1, except that the compound represented by formula (I-1-4) was replaced with the compound represented by formula (I-3-2).

MS (EI): m/z=456

Example 4: Production of the Compound of Formula (I-4)

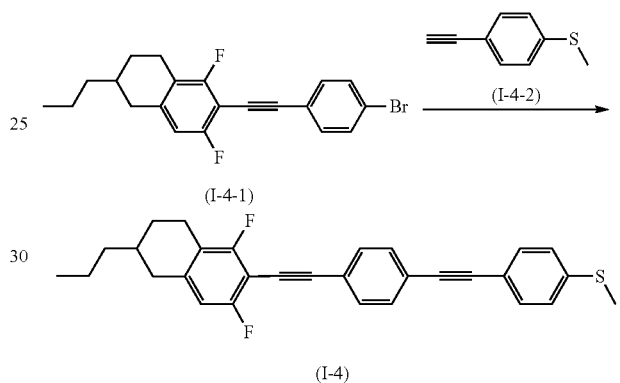

The compound represented by formula (I-4) was produced in the same way as in Example 1, except that the compound represented by formula (I-1-4) was replaced with the compound represented by formula (I-4-2).

MS (EI): m/z=456

Example 5: Production of the Compound of Formula (I-5)

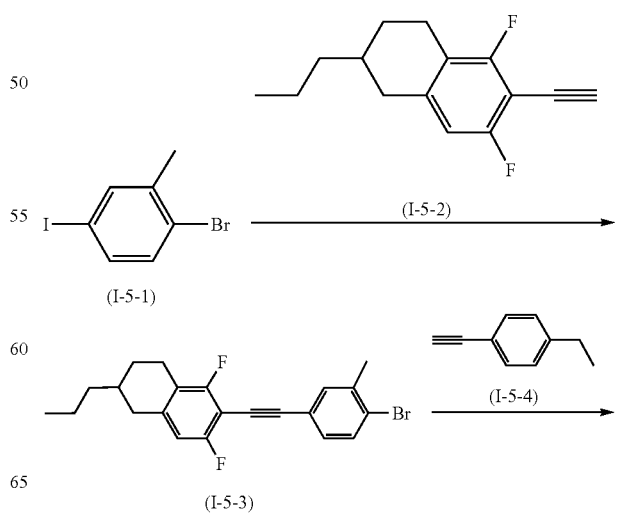

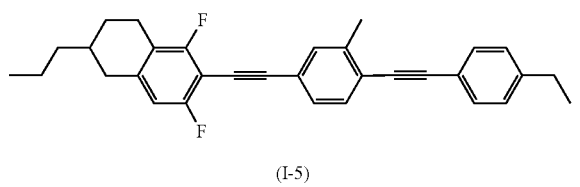

(I-5)

The compound represented by formula (I-5) was produced in the same way as in Example 1, except that the compound represented by formula (I-1-1) was replaced with the compound represented by formula (I-5-1).

MS (EI): m/z=452

Example 6: Production of the Compound of Formula (I-6)

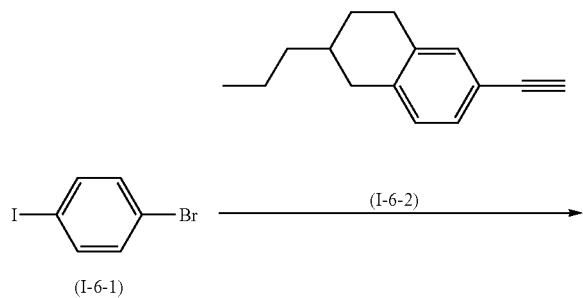

(I-6-1)

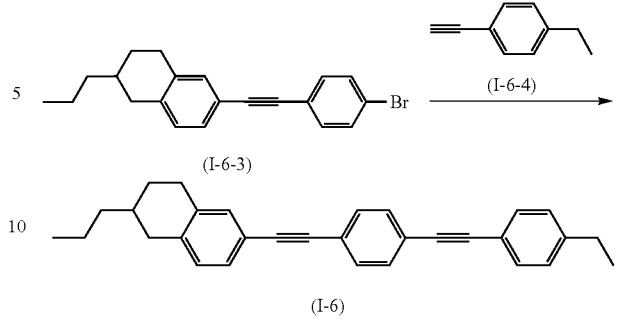

The compound represented by formula (I-6) was produced in the same way as in Example 1, except that the compound represented by formula (I-1-2) was replaced with the compound represented by formula (I-6-1).

MS (EI): m/z=402

Preparation and Testing of Liquid-Crystal Compositions

A host liquid crystal having the following characteristics (LC-1) were prepared. All characteristics values are measurements.

Tni (nematic-isotropic phase transition temperature): 74.0° C.

Δε (dielectric anisotropy at 25° C.): 5.11

Δn (refractive-index anisotropy at 25° C.): 0.141

$\gamma_1$ (rotational viscosity coefficient at 25° C.): 107

Liquid-crystal compositions were prepared by adding each of compounds (I-1) to (I-6), obtained in Examples 1 to 6, or the compounds represented by formulae (C-1) and (C-2), which are found in Japanese Unexamined Patent Application Publication (Translation of PCT Application) No. 2014-514325, to this host liquid crystal (LC-1) to a concentration of 0%, 5%, or 10%.

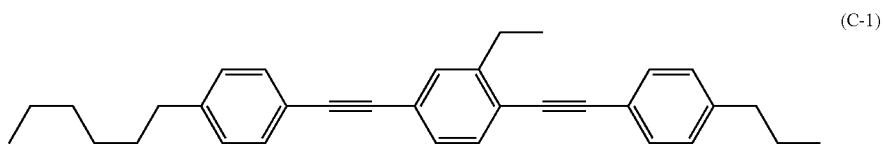

(C-1)

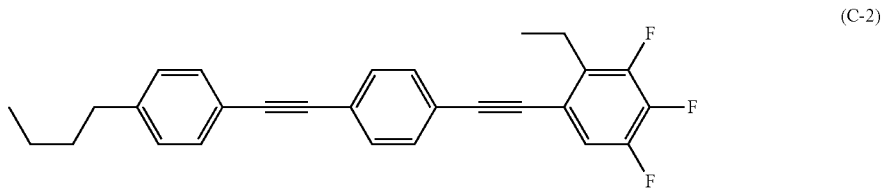

(C-2)

The Δn and Tni extrapolated to 100% by the least-squares method are tabulated below. Comparing Examples 7 to 12 and Comparative Examples 1 and 2 revealed that adding a compound according to the present application to a liquid-crystal composition effectively increases the Δn and Tni of the composition by virtue of its high Δn and Tni.

TABLE 1

|  | Compound | Δn | Tni |
|---|---|---|---|
| Comparative Example 1 | (C-1) | 0.393 | 131.0 |
| Comparative Example 2 | (C-2) | 0.326 | 108.0 |
| Example 7 | (I-1) | 0.456 | >250.0 |
| Example 8 | (I-2) | 0.478 | >250.0 |
| Example 9 | (I-3) | 0.424 | >250.0 |
| Example 10 | (I-4) | 0.496 | >250.0 |
| Example 11 | (I-5) | 0.426 | 217.0 |
| Example 12 | (I-6) | 0.435 | >250.0 |

Then another set of liquid-crystal compositions were prepared by adding each of compounds (I-1) to (I-6), obtained in Examples 1 to 6, or the compound represented by formula (C-3), which is found in Japanese Unexamined Patent Application Publication No. 2013-103897, to the host liquid crystal (LC-1) to a concentration of 10%, and their characteristics were measured as follows.

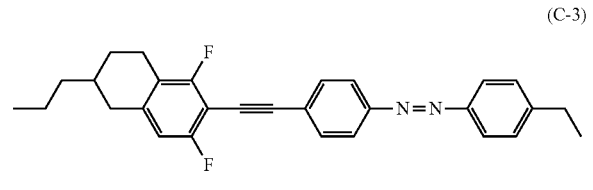 [SMILES: CCCC1CCc2c(cc(F)c(C#Cc3ccc(N=Nc4ccc(CC)cc4)cc3)c2F)C1]
(C-3)

First and second substrates were fabricated. The first substrate had an alignment film (common-electrode substrate), and the second substrate had an alignment film with a pixel-electrode layer as a layer having transparent pixel electrodes driven by active elements (pixel-electrode substrate). A sealant was applied to the first substrate, the second substrate was placed to sandwich the sealant, and the sealant was cured at atmospheric pressure and 120° C. for 1 hour to give a liquid-crystal cell with a cell gap of 3.2 μm. The liquid-crystal cell was filled with the liquid-crystal composition and then sealed. While 10-V and 100-Hz rectangular AC pulses were applied, the workpiece was irradiated with UV radiation with a dose of 100 mW/cm² at 365 nm for 200 seconds to complete the cell.

VHR of the liquid-crystal cell: The voltage holding ratio (%) of the finished liquid-crystal cell at 60° C. was measured at a frequency of 60 Hz and an applied voltage of 1 V and graded on a three-point scale.
A: 95% to 100%
B: 85% to 95%
C: 85% or less VHR after exposure to light: The liquid-crystal composition was irradiated with light from LCD backlighting lamps with a 0.5-mm thick glass sheet therebetween for 1 week. The voltage holding ratio of the irradiated liquid crystal was measured in the same way as in the measurement of VHR, and the grading was made on the following three-point scale.
A: 95% to 100%
B: 85% to 95%
C: 85% or less

TABLE 2

|  | Compound | VHR | VHR after exposure to light |
|---|---|---|---|
| Comparative Example 3 | (C-3) | B | C |
| Example 13 | (I-1) | A | A |
| Example 14 | (I-2) | A | A |
| Example 15 | (I-3) | A | A |
| Example 16 | (I-4) | B | B |
| Example 17 | (I-5) | A | A |
| Example 18 | (I-6) | A | A |

Comparing Examples 13 to 18 and Comparative Example 3 revealed that compounds according to the present application are highly reliable.

Having a large refractive-index anisotropy Δn and a sufficiently high Tni, highly compatible with liquid-crystal compositions, and exhibiting a high dielectric anisotropy in the radio frequency range, the compound according to the disclosure is a useful material for RF phase shifters, phased-array antennae, image recognition devices, distance meters, liquid-crystal displays, liquid-crystal lenses, and birefringent lenses for 3D image display, among other devices.

What is claimed is:

1. A compound represented by general formula (1):

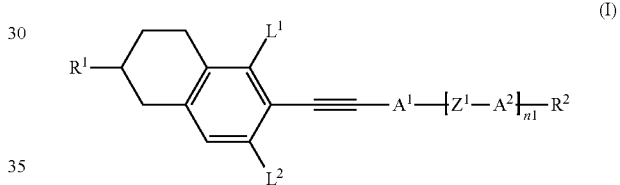
(I)

where $R^1$ denotes a hydrogen atom or a C1 to C20 linear or C3 to C20 branched or cyclic alkyl group, the alkyl group optionally having any hydrogen atom therein replaced with a halogen atom and optionally having one —CH$_2$— therein, or each of two or more independently, replaced with —O—, —S—, —CO—, —CS—, —COO—, —OCO—, —CO—S—, —S—CO—, —O—CO—O—, —CO—NH—, —NH—CO—, —CH=CH—, —CF=CF—, or —C≡C—, with the proviso that no oxygen atoms are bound directly to one another;

$R^2$ denotes a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, or a C1 to C20 linear or C3 to C20 branched or cyclic alkyl group optionally having one —CH$_2$— therein, or each of two or more independently, replaced with —O—, —S—, —CO—, —CS—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, with the proviso that no oxygen atoms are bound directly to one another, the alkyl group optionally having any hydrogen atom therein replaced with a fluorine atom;

A¹ and A² each independently denote a substituted or unsubstituted C3 to C16 hydrocarbon ring or heterocycle, and a plurality of A²s may be the same or different;

L¹ and L² each independently denote a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a C1 to C20 linear or C3 to C20 branched or cyclic alkyl group optionally having one —CH₂— therein, or each of two or more independently, replaced with —O—, —S—, —CO—, —CS—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or with the proviso that no oxygen atoms are bound directly to one another, the alkyl group optionally having any hydrogen atom therein replaced with a fluorine atom;

Z¹ on each occurrence independently denotes a single bond, —CH=CH or —C≡, a plurality of Z¹s may be the same or different, and at least one of the Z¹s, or the Z¹ if there is only one Z¹, denotes C≡C—; and n1 denotes an integer of 1 to 3.

2. The compound according to claim 1, wherein:
in general formula (I), A¹ and A² each independently denote a group selected from the group consisting of:
(a) a 1,4-cyclohexylene group optionally having one —CH₂—or two or more nonadjacent —CH₂—s therein replaced with —O— or —S—;
(b) a 1,4-phenylene group optionally having one —CH= or two or more nonadjacent —CH=s therein replaced with —N=;
(c) a 1,4-cyclohexenylene, bicyclo[2.2.2]octane-1,4-diyl, naphthalene-2,6-diyl, naphthalene-1,4-diyl, 1,2,3,4-tetrahydronaphthalene-2,6-diyl, 5,6,7,8-tetrahydronaphthalene-1,4-diyl, decahydronaphthalene-2,6-diyl, anthracene-2,6-diyl, anthracene-1,4-diyl, anthracene-9,10-diyl, or phenanthrene-2,7-diyl group optionally having at least one hydrogen atom therein replaced with a fluorine or chlorine atom, the naphthalene-2,6-diyl, naphthalene-1,4-diyl, 1,2,3,4-tetrahydronaphthalene-2,6-diyl, 5,6,7,8-tetrahydronaphthalene-1,4-diyl, anthracene-2,6-diyl, anthracene-1,4-diyl, anthracene-9,10-diyl, or phenanthrene-2,7-diyl group optionally having one —CH— or two or more —CH=s therein replaced with —N=; and
(d) a thiophene-2,5-diyl, benzothiophene-2,5-diyl, benzothiophene-2,6-diyl, dibenzothiophene-3,7-diyl, dibenzothiophene-2,6-diyl, or thieno [3,2-b]thiophene-2,5-diyl group optionally having one —CH= or two or more nonadjacent —CH=s therein replaced with —N=, unsubstituted or substituted with one or more substituents L³, and a plurality of A²s may be the same or different;

L³ on each occurrence independently denotes a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a C1 to C20 linear or C3 to C20 branched or cyclic alkyl group optionally having one —CH₂— therein, or each of two or more independently, replaced with —O—, —S—, —CO—, —CS—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —CC—, with the proviso that no oxygen atoms are bound directly to one another, the alkyl group optionally having any hydrogen atom therein replaced with a fluorine atom.

3. The compound according to claim 1, wherein:
general formula (I) is represented by general formula (I-i):

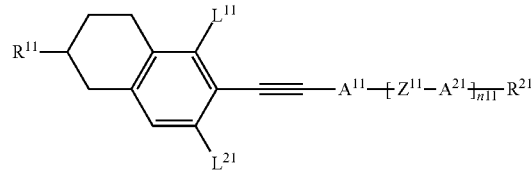

(I-i)

where R¹¹ on each occurrence independently denotes a hydrogen atom or a C1 to C20 linear or C3 to C20 branched alkyl group, the alkyl group optionally having any hydrogen atom therein replaced with a halogen atom and optionally having one —CH₂—therein, or each of two or more independently, replaced with —O—, —S—, —CH=CH—, —CF=CF—, or —C≡C—;

R²¹ denotes a fluorine atom, a chlorine atom, a nitro group, a cyano group, an isocyano group, or a C1 to C20 linear or C3 to C20 branched or cyclic alkyl group, the alkyl group optionally having any hydrogen atom therein replaced with a fluorine atom and optionally having one —CH₂— therein, or each of two or more independently, replaced with —O—, —S—, —CH=CH—, —CF=CF—, or —C≡C—;

A¹¹ and A²¹ each independently denote a 1,4-cyclohexylene, tetrahydropyrane-2,5-diyl, dioxane-2,5-diyl, 1,4-phenylene, naphthalene-2,6-diyl, naphthalene-1,4-diyl, 5,6,7,8-tetrahydronaphthalene-1,4-diyl, phenanthrene-2,7-diyl, benzothiophene-2,5-diyl, benzothiophene-2,6-diyl, benzothiazole-2,5-diyl, benzothiazole-2,6-diyl, dibenzothiophene-3,7-diyl, dibenzothiophene-2,6-diyl, or thieno[3,2-b]thiophene-2,5-diyl group, a plurality of A²¹s may be the same or different, and the groups A¹¹ and A²¹ may be unsubstituted or substituted with one or more substituents L³¹;

L¹¹ and L²¹ each independently denote a hydrogen atom, a fluorine atom, a chlorine atom, or a C1 to C20 linear or C3 to C20 branched or cyclic alkyl group, the alkyl group optionally having any hydrogen atom therein replaced with a fluorine atom and optionally having one —CH₂—therein, or each of two or more independently, replaced with —O—, —S—, —CF=CF—, or —C≡C—;

L³¹ on each occurrence independently denotes a fluorine atom, a chlorine atom, or a C1 to C20 linear or C3 to C20 branched or cyclic alkyl group, the alkyl group optionally having any hydrogen atom therein replaced with a fluorine atom and optionally having one —CH₂— therein, or each of two or more independently, replaced with —O—, —S—, —CH=CH—, —CF=CF—, and a plurality of $L^{31}$s may be the same or different;

$Z^{11}$ on each occurrence independently denotes a single bond or —C≡C—, a plurality of $Z^{11}$s may be the same or different, and at least one of the $Z^{11}$s, or the $Z^{11}$ if there is only one $Z^{11}$, denotes C≡C—; and n11 denotes an integer of 1 to 3.

4. The compound according to claim 1, wherein:

general formula (I) is represented by general formula (I-ii):

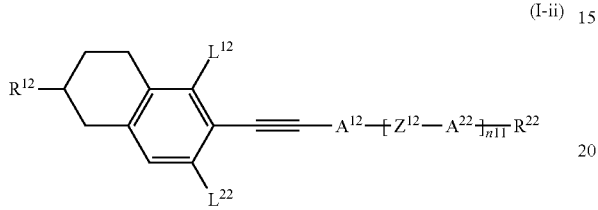

(I-ii)

where $R^{12}$ denotes a C1 to C12 linear or C3 to C12 branched alkyl group, the alkyl group optionally having any hydrogen atom therein replaced with a fluorine atom and optionally having one —CH$_2$— therein, or each of two or more independently, replaced with —O—, —CH=CH—, or —C≡—;

$R^{22}$ denotes a fluorine atom, a cyano group, or a C1 to C10 linear or C3 to C10 branched or cyclic alkyl group, the alkyl group optionally having any hydrogen atom therein replaced with a fluorine atom and optionally having at least one —CH$_2$— therein replaced with —O—;

$A^{12}$ and $A^{22}$ each independently denote a group selected from formulae (A-ii-1) to (A-ii-17), and a plurality of $A^{22}$s may be the same or different:

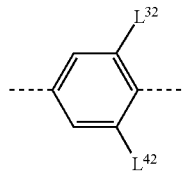

(A-ii-1)

(A-ii-2)

(A-ii-3)

(A-ii-4)

(A-ii-5)

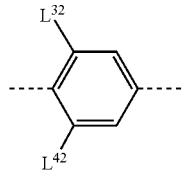

(A-ii-6)

(A-ii-7)

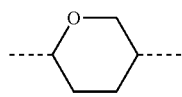

(A-ii-8)

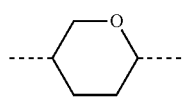

(A-ii-9)

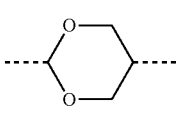

(A-ii-10)

(A-ii-11)

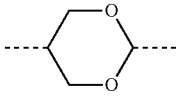

(A-ii-12)

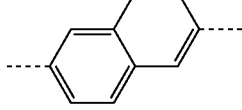

(A-ii-13)

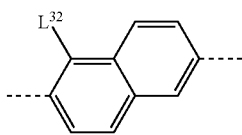

(A-ii-14)

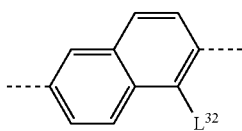

(A-ii-15)

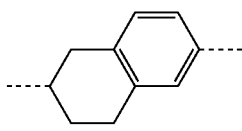

(A-ii-16)

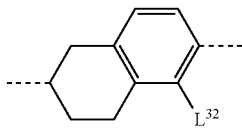

-continued

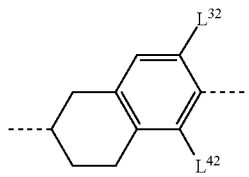

(A-ii-17)

where broken lines represent binding sites, and a plurality of $L^{32}$s and $L^{42}$s may be the same or different;

$L^{12}$, $L^{22}$, $L^{32}$, and $L^{42}$ each independently denote a hydrogen atom, a flourine atom, or a C1 to C10 linear or C3 to C10 branched or cyclic alkyl group, the alkyl group optionally having any hydrogen atom therein replaced with a fluorine atom and optionally having at least one —CH$_2$— therein replaced with —O—;

$Z^{12}$ on each occurrence independently denotes —C≡C; and n12 denotes an integer of 1 to 3.

5. A composition comprising the compound according to claim 1.

6. A liquid-crystal composition comprising the compound according to claim 1.

7. The liquid-crystal composition according to claim 6, wherein the composition has a refractive-index anisotropy of 0.15 or more.

8. The liquid-crystal composition according to claim 6, wherein the composition has a dielectric anisotropy of 2 or more.

9. The liquid-crystal composition according to claim 6, wherein the composition has a dielectric anisotropy of 2 or less.

10. A radio frequency phase shifter, a phased-array antenna, an image recognition device, a distance meter, a liquid-crystal display, a liquid-crystal lens, or a birefringent lens for 3D image display comprising the liquid-crystal composition according to claim 6.

* * * * *